United States Patent [19]

Seo et al.

[11] Patent Number: 5,697,699

[45] Date of Patent: Dec. 16, 1997

[54] LIGHTING APPARATUS

[75] Inventors: Shuzo Seo; Nobuhiro Tani, both of Tokyo, Japan

[73] Assignee: Asahi Kogaku Kogyo Kabushiki Kaisha, Tokyo, Japan

[21] Appl. No.: 303,463

[22] Filed: Sep. 9, 1994

[30] Foreign Application Priority Data

| Sep. 9, 1993 | [JP] | Japan | 5-249897 |
| Sep. 20, 1993 | [JP] | Japan | 5-256468 |
| Sep. 24, 1993 | [JP] | Japan | 5-261845 |
| Apr. 1, 1994 | [JP] | Japan | 6-087818 |

[51] Int. Cl.$^6$ ............................................. F21P 1/00
[52] U.S. Cl. ..................... 362/252; 362/246; 362/800; 235/472
[58] Field of Search ........................ 235/472, 494; 362/246, 250, 251, 252, 800

[56] References Cited

U.S. PATENT DOCUMENTS 5,179,269  1/1993  Horie et al. ........................ 235/455
5,349,172  9/1994  Roustaei ........................... 235/472

Primary Examiner—Stephen F. Husar
Attorney, Agent, or Firm—Greenblum & Bernstein P.L.C.

[57] ABSTRACT

A lighting apparatus is provided which illuminates a two dimensional data reading area in a data reader and which includes a plurality of light sources which are arranged along one pair of opposing sides of the two dimensional data reading area. An optical axis for each of the light sources is inclined at a predetermined inclination angle with respect to a line that is normal to a reference surface of the data reading area. The optical axes of the light rays emitted from the light sources onto the reference surface are spaced from the pair of sides of the two dimensional data reading area, at a distance within a range of 0.1 to 0.34 times the length of the other pair of opposing sides of the two dimensional data reading area.

22 Claims, 29 Drawing Sheets

Fig. 6
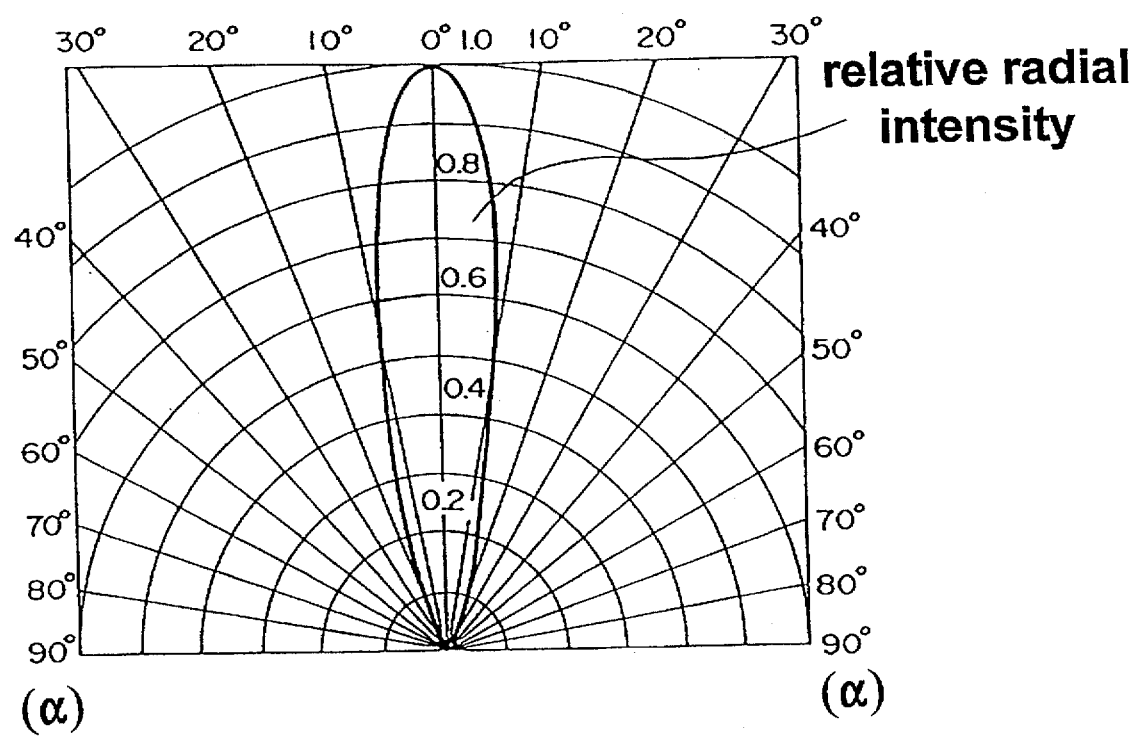
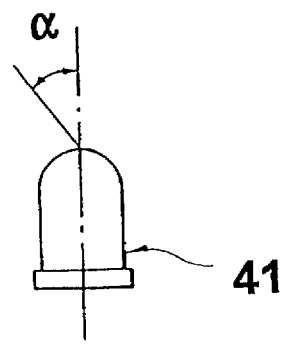

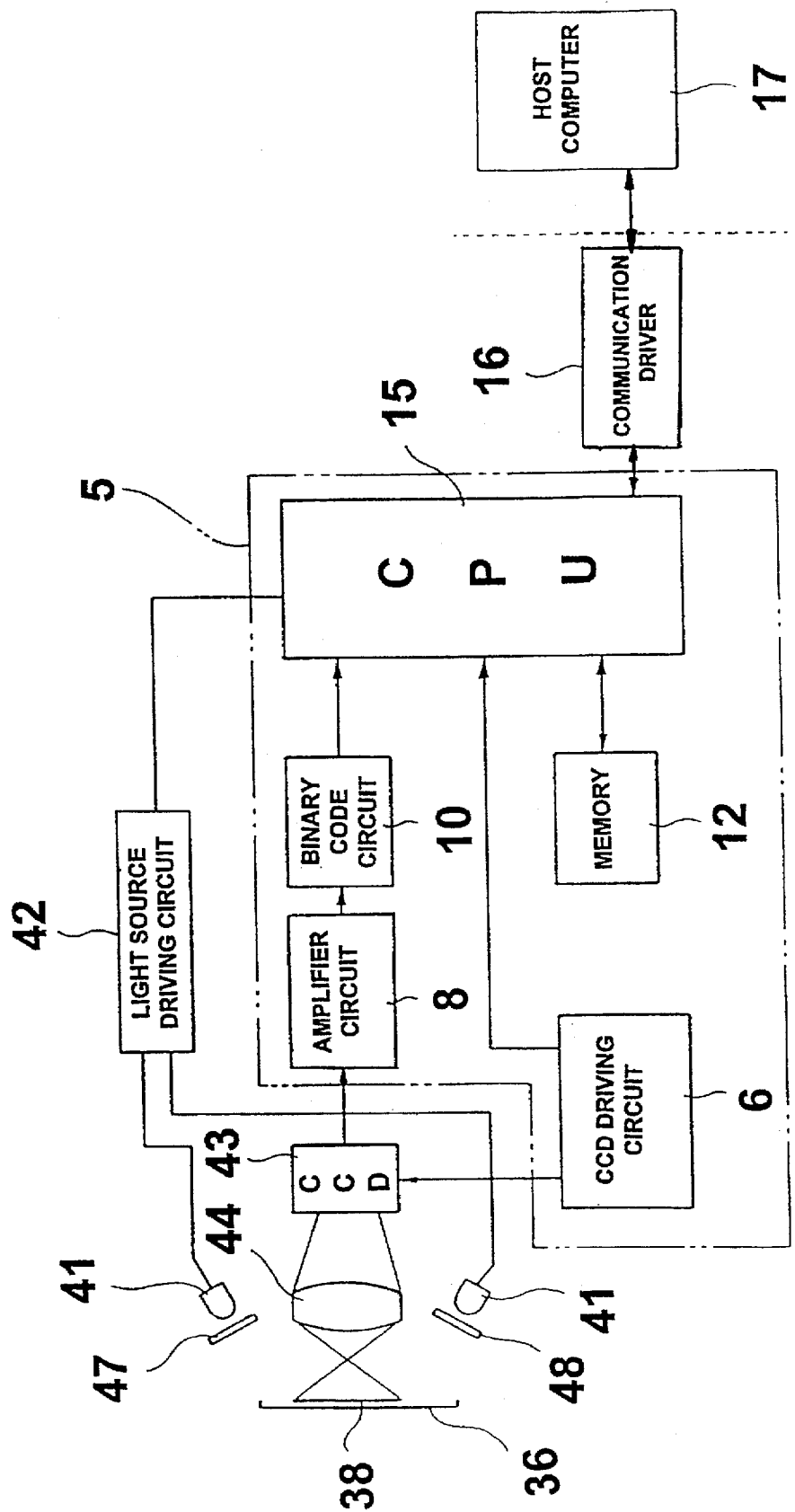

α= 0.2
β= 0.2
θ= 50°

α= 0.2
β= 0.2
θ= 45°

$\alpha = 0.35$
$\beta = 0.2$
$\theta = 45°$

EMITTING SURFACES OF PRISMS HAVING NO DIFFUSION SURFACES

MAJOR DIRECTION OF THE DATA READING AREA

EMITTING SURFACES OF PRISMS HAVING DIFFUSION SURFACES

LIGHTING APPARATUS

BACKGROUND OF THE INVENTION

1. Field of the Invention

The present invention relates to a lighting apparatus which is mounted, for example, to a data reader which reads coded data such as two-dimensional data symbols.

2. Description of the Related Art

In a known POS (Point-of-Sale) system, a bar code reader (optical scanner) reads a bar code which represents sales data. The bar code which is in the form of a series of lines of varying width is scanned perpendicular to the direction in which the lines were drawn, by laser beams. However, not much data can be obtained from the bar code using this one-dimensional scanning method.

In order to provide much more data, a two-dimensional data symbol consisting of a two-dimensional matrix (mosaic pattern) of, for example, white and black segments has been recently proposed and used. However, there are few simple data readers available, particularly those kinds using an area sensor to read the two-dimensional data symbols.

In order to simultaneously read two-dimensional data symbols placed in orthogonal directions within a plane, it is necessary to uniformly illuminate the two-dimensional data symbols in the orthogonal directions. Accordingly, if a conventional lighting apparatus, which has been used for a data reader for one-dimensional data symbols to uniformly illuminate the latter only in one direction, is used for the two dimensional symbol data, it is impossible to uniformly illuminate the latter in the orthogonal directions. Hence, in an attempt to develop a data reader for two-dimensional data symbols, it is necessary to realize a lighting apparatus which can simultaneously and uniformly illuminate two-dimensional data symbols within a data reading area which is drawn on a single plane.

Furthermore, if the light emitted from the light source is reflected within the data reading area and reaches the CCD, a spurious image of the light source is formed on the CCD, thus resulting in a failure to correctly read the data.

To solve these problems, it is necessary to provide an appropriate angle between the optical axis of the illumination light and a line normal to a reference surface on which the two-dimensional data symbols are formed within the data reading area.

However, if there is a large angle of inclination of the optical axis of the illumination light with respect to the normal line to the reference surface, the lateral size of the lighting apparatus is increased, leading to a large data reading apparatus.

SUMMARY OF THE INVENTION

The primary object of the present invention is to provide a small data symbol reading apparatus in which two-dimensional data symbols within a data reading area can be uniformly illuminated and can be correctly read, regardless of the state of the reference surface of the data reading area.

To achieve the object mentioned above, according to the present invention, a lighting apparatus which illuminates a two dimensional data reading area in a data reader is provided. The lighting apparatus includes a plurality of light sources arranged along one pair of opposing sides of the two dimensional data reading area, and an optical axis for each light source being inclined at a predetermined inclination angle with respect to a line normal to a reference surface which includes the two dimensional data reading area.

According to another aspect of the present invention, a lighting apparatus which illuminates a two dimensional data reading area in a data reader is provided. The lighting apparatus includes a plurality of light sources arranged along one pair of sides of the two dimensional data reading area, and an optical axis is provided for each said light source being inclined at a predetermined inclination angle with respect to a line normal to a reference surface which includes the data reading area. The optical axes of light rays emitted from the light sources onto the reference surface are spaced from one pair of the sides of the two dimensional data reading area at a distance between a range of 0.1 to 0.34 times the length of the other pair of opposing sides of said two dimensional data reading side.

According to the another aspect of the present invention, a lighting apparatus which illuminates a rectangular data reading area in a data reader Is provided, which includes a plurality of light sources which emit light beams to illuminate the rectangular data reading area. An adjuster if provided for each of the light sources which adjusts the luminance of the light source at a center point of illumination of the light source incident on a reference surface which includes the data reading area, to thereby uniformly illuminating the data reading area.

According to the another aspect of the present invention, a data symbol reading apparatus for reading a plurality of two dimensional data symbols is provided, which includes a light source for illuminating a data reading area. The data reader area receives a light reflected from the data reading area, and a light guiding optical system is provided which has a mechanism deflect the light emitted from the light source such that the light emitted from the light source is incident upon a data reading area. An optical axis of the light source is inclined at a predetermined inclination angle with respect to a line normal to the data reading area.

According to the still another aspect of the present invention, a data symbol reading apparatus for reading two-dimensional data symbols in provided, which includes a light source for illuminating a data reading area, a data reader area which receives a light reflected from the data reading area, and a prism which is provided with a reflecting surface and an emitting surface and which deflects a light emitted from the light source to make the light incident upon a reference surface of the data reading portion. The prism is provided on the emitting surface with a plurality of V-shaped grooves, that are arranged in a direction of a line normal to the light receiving surface of the data reader area.

The present disclosure relates to subject matter contained in Japanese patent application Nos. 05-249897 (filed on Sep. 9, 1993), 05-256468 (filed on Sep. 20, 1993), 05-261845 (filed on Sep. 24, 1993), and 06-87818 (filed on Apr. 1, 1994) which are expressly incorporated herein by reference in their entirety.

BRIEF DESCRIPTION OF THE DRAWINGS

The invention will be described below in detail with reference to the accompanying drawings, in which;

FIG. 6 is a graph of an orientation characteristic curve of a light source (light emitting diode);

FIG. 7 is a block diagram of a circuit in a data reader;

DESCRIPTION OF THE PREFERRED EMBODIMENT

Figure 1:
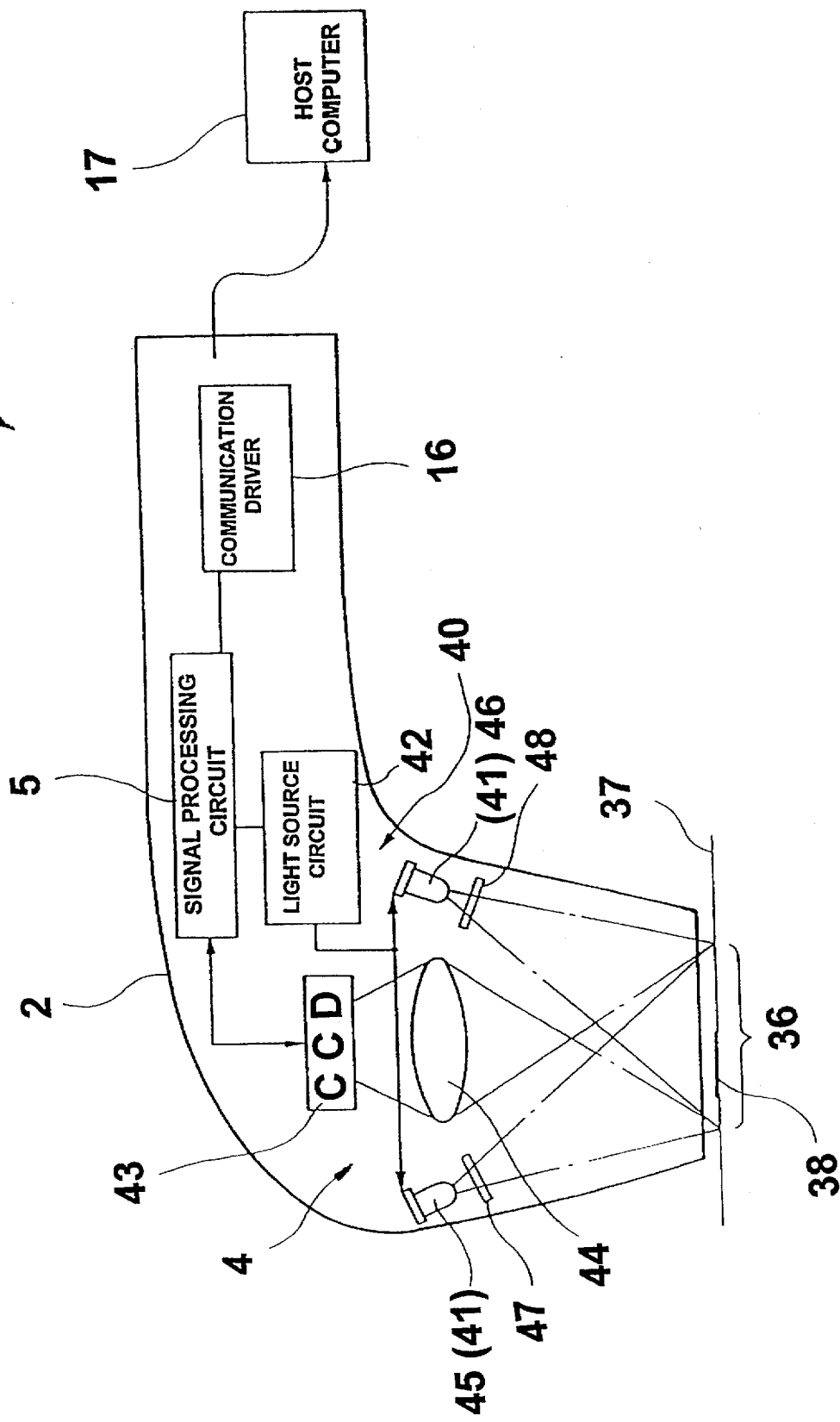
FIG. 1 is a schematic side sectional view of a data reader according to the present invention.

FIG. 1 schematically shows an internal structure of a portable data reader 1, which includes a casing 2, which integrally provides a lighting apparatus 40 and a data reader 4 which reads a data symbol 38.

The lighting apparatus 40 is provided with two arrays of light sources 45 and 46 on opposed sides of the data reader 4. The lighting apparatus 40 is connected to a light source driving circuit 42 which activates light emitters 41, including a light emitting element such as an LED, a halogen lamp, or a semiconductor laser, etc.

The data reader 4 which is provided between the light source arrays 41 is comprised of a CCD (charge coupled device) sensor 43 (an area sensor) and an optical system 44 which converges light reflected from the data reading area 36, which will be discussed hereinafter, onto the CCD sensor 43. The CCD sensor 43 includes a number of picture elements (pixels) in a matrix arrangement within a light receiving area, so that the picture elements accumulate electric charges corresponding to the luminous energy received. The electric charges are sent to and read by a signal processing circuit 5 at a predetermined time. The electric charges read constitute two-dimensional signals corresponding to the light receiving area.

In the illustrated embodiment, the CCD sensor 43 can be of any type that detects the brightness (luminance) of each part of the data symbol 38. Depending on the structure of the data symbol to be read, a CCD sensor for a color image can be used.

The optical system 44 is comprised of optical elements in combination, such as lens(es), prism(s), filter(s), and/or mirror(s), etc.

Figure 3:
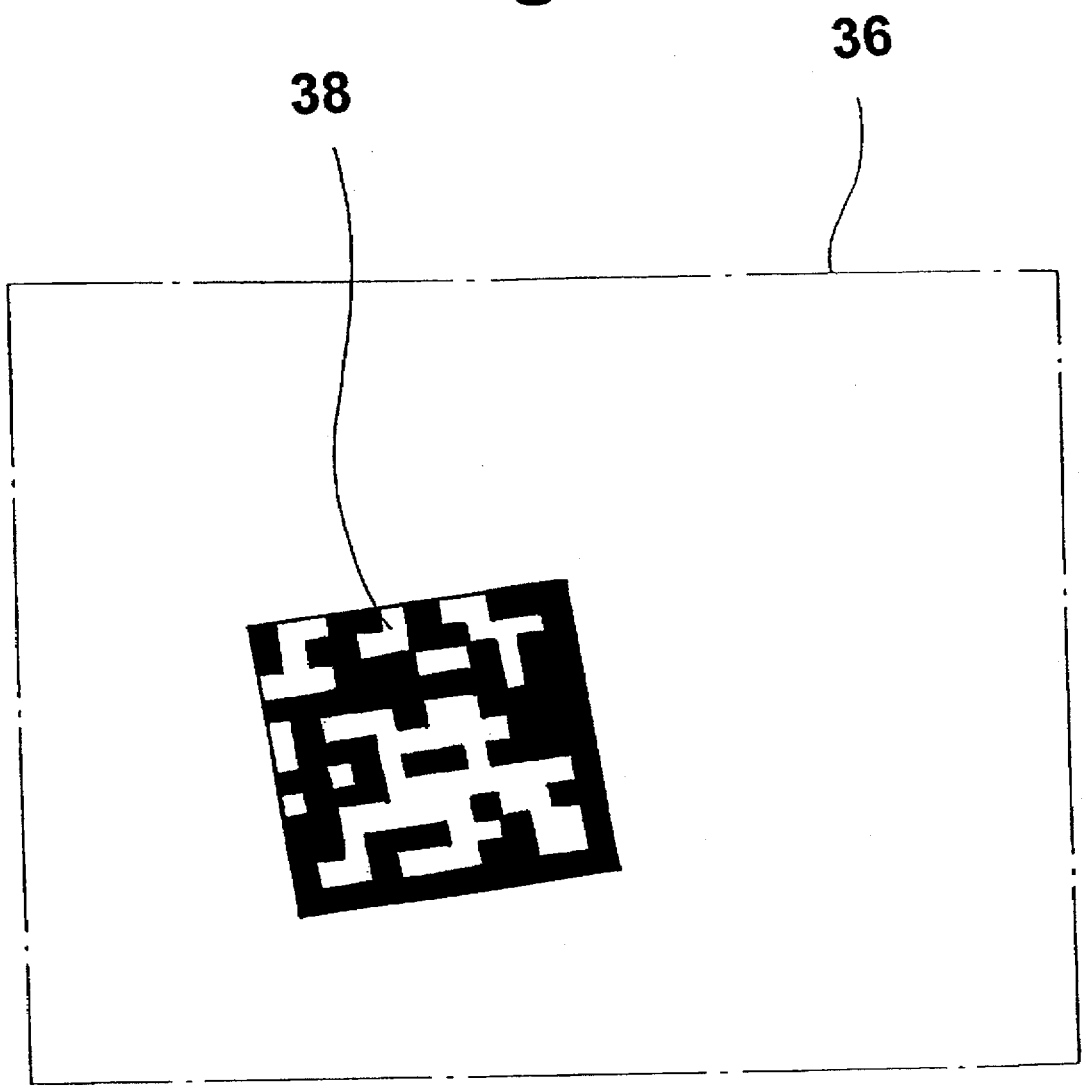
FIG. 3 is a plan view of a symbol reading area, by way of example.

FIG. 3 shows an example of a data (symbol) reading area 36 in plan view. As can be seen in FIG. 3, the data reading area 36 indicated by a dotted and dashed line defines an area of a reference surface 37 (on which the data symbol 38 lies) that is illuminated with light from the lighting apparatus 40, so that the light reflected thereby can be received by the data reader 4 to read data represented by the symbol 38. For example, if a general-purpose CCD sensor is used, the data reading area 36 is in the form of a rectangle of 4×3.

In the illustrated embodiment, the data symbol (symbol code) 38 forms a mosaic pattern of black and white (or transparent) segments in a matrix arrangement of x (row)× y (column), wherein x and y are integers equal to or more than 2. The black and white segments represent "0" or "1", for example, in a binary number system. Consequently, desired information is represented by a combination of "0" and "1". Note that the data symbol 38 is not limited to the illustrated embodiment.

With the arrangement of the lighting apparatus 40 and the data reader 4 as constructed above, when the light sources 41 are turned ON by the light source driving circuit 42, the beams emitted from the light sources 41 are made incident upon the data reading area 36, so that the light reflected thereby can be received by the light receiving surface of the CCD 43 through the optical system. Hence, the CCD 43 outputs image signals (analog signals) corresponding to the quantity of light (luminous energy) to be received.

The lighting apparatus 40 will be discussed below in detail with reference to FIG. 2. The lighting apparatus 40 is comprised of a plurality of light source arrays 45 and 46, and optical diffusion systems 47 and 48 provided between the respective light source arrays 45 and 46 and the data reading area 36.

The light source arrays 45 and 46 are each provided with two light emitting elements (light sources) 41. It is possible to provide more than two light emitting elements 41 in each light source array 45 or 46.

The light source arrays 45 and 46 are located above and along the major sides of the data reading area 36 in a data reading position. Although the diffusion systems 47 and 48 are made of diffusion plates having diffusion surfaces in the illustrated embodiment, the diffusion systems 47 and 48 can be made of, for example, cylindrical lenses. Alternatively, if light sources having a weak direction determining capability are used, the diffusion systems can be eliminated.

Figure 4:
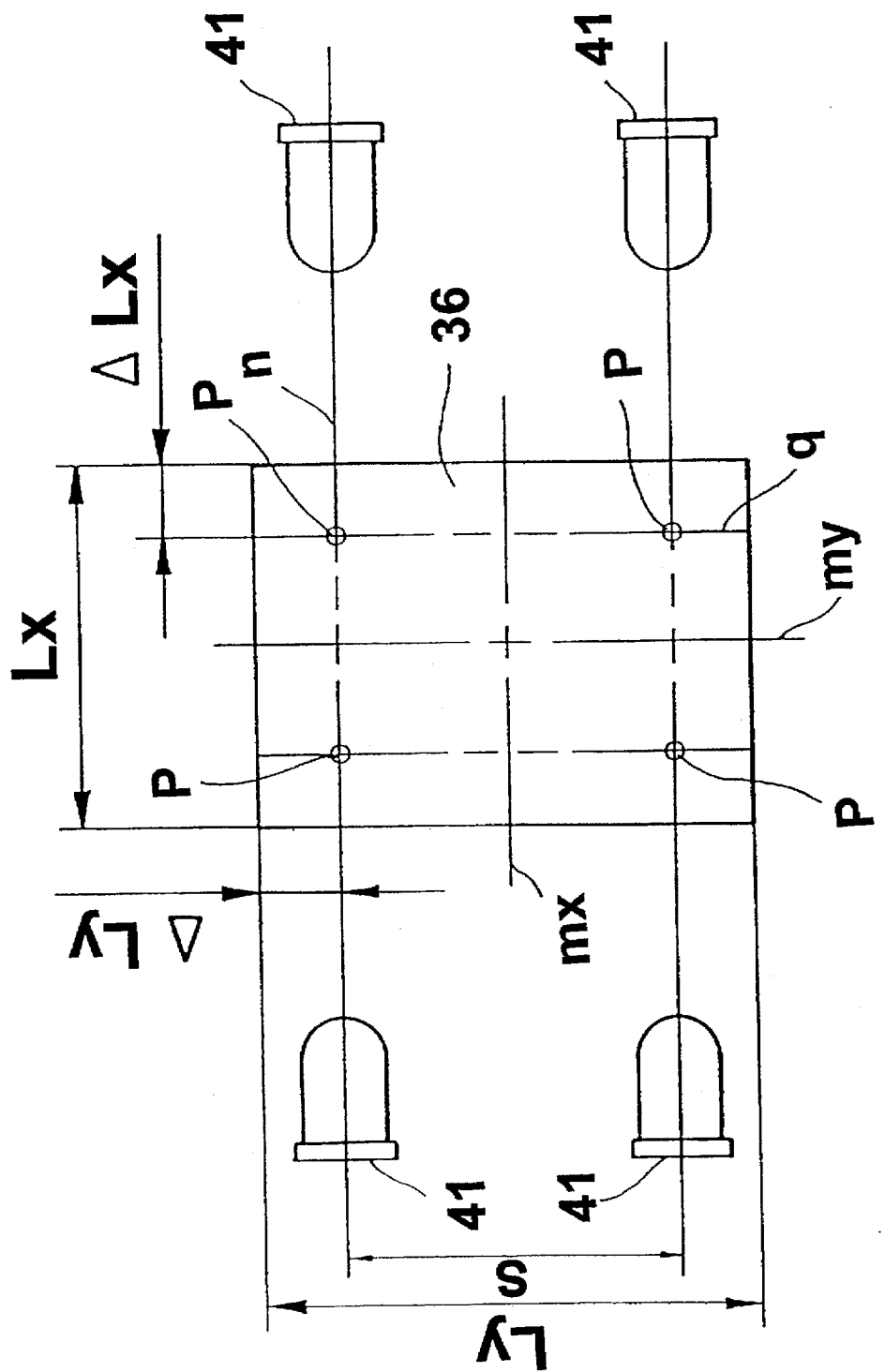
FIG. 4 is a plan view of illuminating points by a light source within a data reading area.
Figure 5:
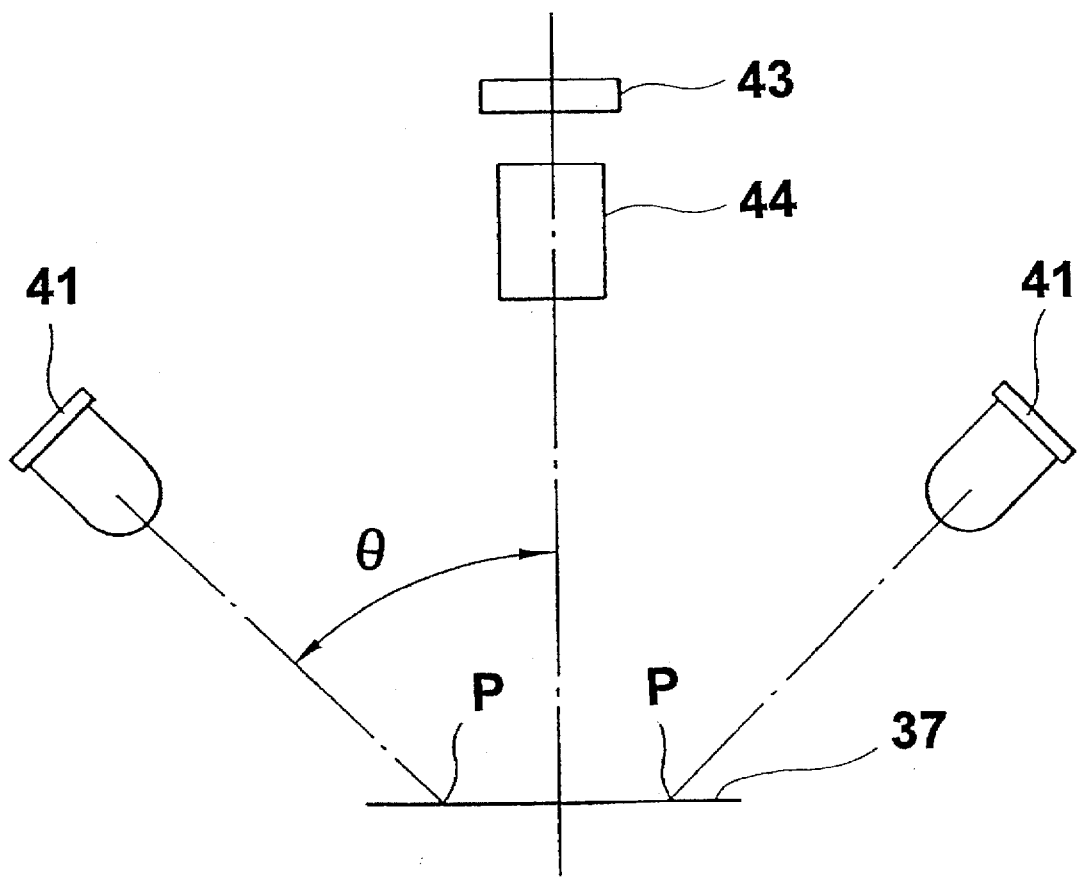
FIG. 5 is an explanatory view of an illumination angle of light emitted from a light source onto a data reading area.
Figure 8A:
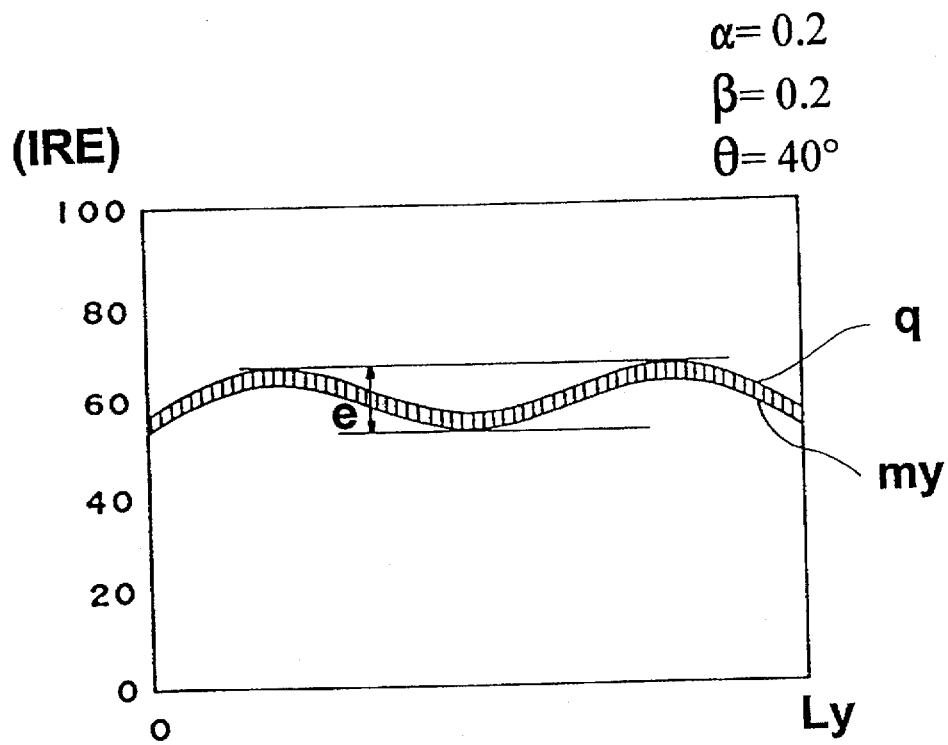
FIGS. 8a and 8b are diagrams of a first example of a luminance distribution on a data reading area of a data reader, in a major direction and a minor direction, respectively.
Figure 8B:
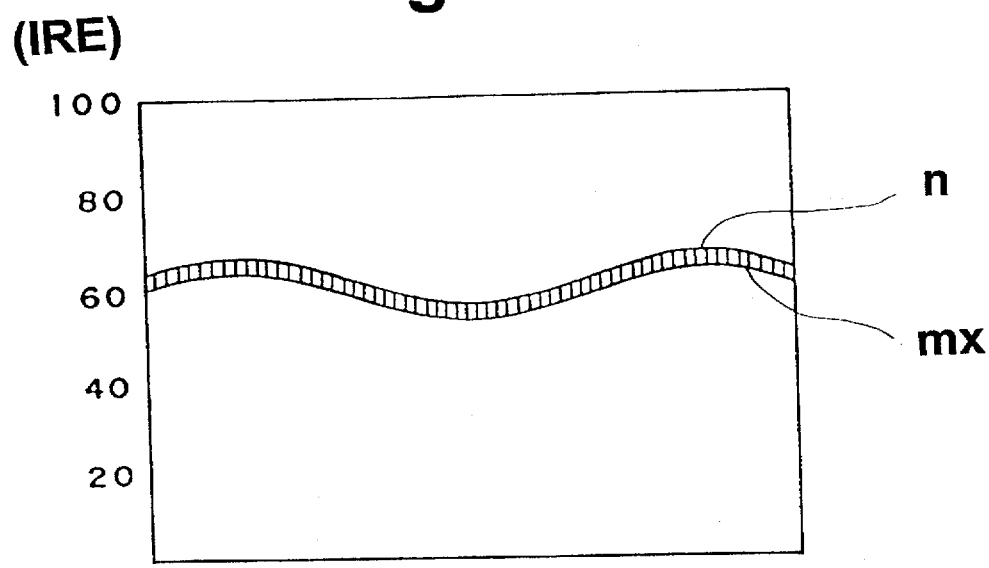
Figure 9A:
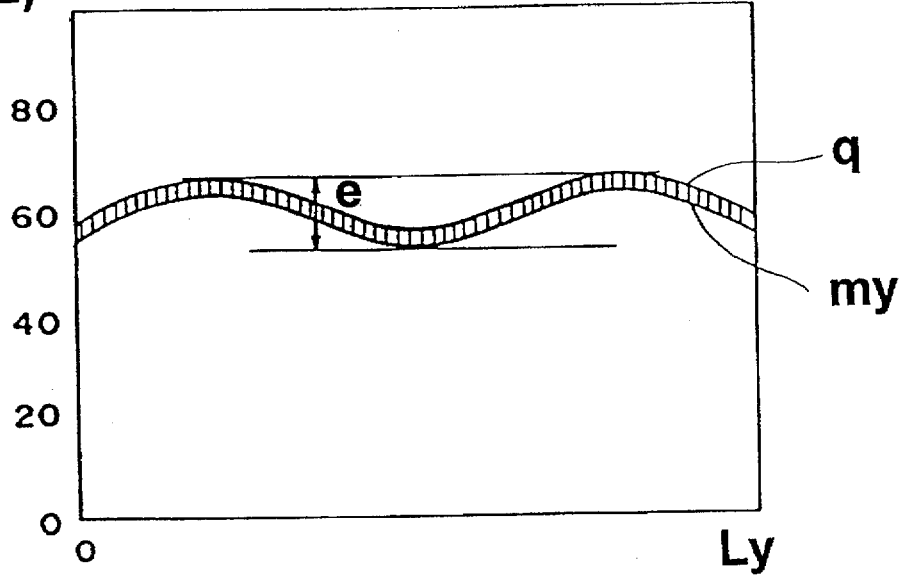
FIGS. 9a and 9b are diagrams of a second example of a luminance distribution on a data reading area of a data reader, in a major direction and a minor direction, respectively.
Figure 9B:
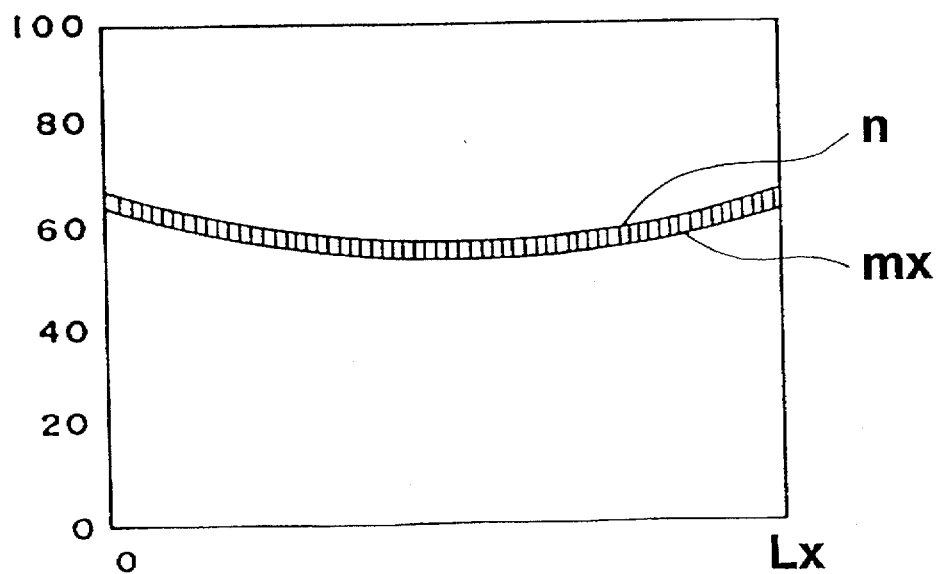

The illumination direction of the light emitters 41 is such that the beams are emitted thereby inward from the outside of the data reading area 36 in oblique directions. Namely, in a plan view shown in FIG. 4, the optical axes of the light emitted from the respective light emitters 41 are parallel with and normal to the minor sides and the major sides of the rectangular data reading area 36, respectively. Also, in a side view of the data reading area 36 viewed from one of the minor sides thereof, as shown in FIG. 5, the beams are incident upon the data reading area 36 at an incident angle θ with respect to the line normal to the reference surface 37.

In the illustrated embodiment, the incident angle θ is 30° to 60°, preferably, 40° to 50°, and most preferably, 43° to 48°. If the incident angle is smaller than the lower limit (30°), the beams are extremely concentrated at the center point P of illumination, so that the data reading area 36 can not be sufficiently illuminated, thus resulting in an irregular degree of brightness. Furthermore, the directly reflected light component is increased, so that spurious images of the light sources occur, causing reading errors. Conversely, if the incident angle is above the upper limit (60°), there is an increase in the variation of the brightness in the major side direction of the data reading rectangular area (i.e., the direction of the arrays).

The light sources (light emitters) 41 have a substantially identical luminance and a substantially identical orientation property. The light sources 41 that constitute the same array 45 or 46 are oriented in the same direction so as to have parallel optical axes. FIG. 4 shows the light data reading area 36 illuminated by four light sources 41 as in the illustrated embodiment. The centers of the incident light sources on the data reading area are marked "P". Lines drawn in the minor and major directions connecting the points P ere indicated as "n" and "q" respectively. "n" and "q" are parallel to the minor and major sides respectively. The lines "q" are between the median line "my" of the data reading area 36 and the respective major sides, parallel with the major sides thereof and are closer to the respective major sides than to the median line "my". The lines "n" are between the median line "mx" of the data reading area 36 and the respective major sides, parallel with the minor sides thereof and are closer to the respective minor sides than to the median line "mx".

In the illustrated embodiment, the positions of the lines "q" and "n" are respectively defined by;

$$\Delta Lx = \alpha Lx, \Delta Ly = \beta Ly$$

wherein "Lx" designates the length of the minor sides, "Ly" the distance between the lines "q" and the corresponding major sides, "Δ Ly" the distance between the lines "n" and the corresponding minor sides, respectively.

The value of α is approximately 0.1 to 0.34, and preferably 0.15 to 0.22. If the value of α is smaller than 0.1, the center portion of the data reading area 36 tends to be dark. If the value of α is larger than 0.34, the edge portions of the data reading area 36 in the vicinity of the major sides thereof are dark, resulting in a non-uniform illumination of the entire data reading area 36.

The value of β is approximately 0.1 to 0.25, and preferably 0.1 to 0.2. If the value of β is smaller than 0.1, the center portion of the data reading area 36 tends to be dark. If the value of β is larger than 0.25, the edge portions of the data reading area 36 in the vicinity of the major sides thereof are dark, resulting in a non-uniform illumination of the data reading area 36.

The light sources 41 preferably have an identical luminance. The orientation property of the light sources 41 is shown in FIG. 6 by way of example.

In the illustrated embodiment, the light sources (light emitters) 41 are disposed in a symmetrical arrangement with respect to a plane perpendicular to the reference surface 37, including the median line "my". The center points P of illumination are disposed in a symmetrical arrangement with respect to the median lines "mx" and "my", respectively.

When the beams emitted from the light sources 41 are transmitted through the diffusion systems 47 and 48, the beams are diffused to illuminate a predetermined zone of the data reading area 36. Since the optical axes of the beams are inclined toward the major sides along the minor sides, with respect to the reference surface 37, the beams are diffused toward the median line "my" of the data reading area 36 from the optical axes. The diffused lights from the opposed light sources are overlapped on the median line "my", so that the luminance at the median line "my" or in the vicinity thereof is substantially the same as the luminance at the center points P of illumination, thus resulting in a uniform brightness over the whole data reading area 36.

It is not necessary for the direction of the beams emitted from the light sources to be parallel with the minor sides of the data reading area, as shown in FIG. 4. Namely, the beams can be emitted inward from the outside of the minor sides in oblique directions by the light sources to be parallel with the major sides.

As can be seen in FIG. 7, the signal processing circuit 5 essentially includes a CCD driving circuit 6, an amplifier circuit 8, a binary code circuit 10, a memory 12, a control means (CPU) 15, a communicating driver 16, and lines connecting these elements.

A light source driving circuit 42, a switch circuit and/or a display such as LCD (Liquid Crystal Display), not shown are connected to the control means 15, in accordance with need.

The data is read by the data symbol reader 1 when a trigger switch is tuned ON. The signals processed by the signal processing circuit 5 are decoded into desired data and then inputted to an external computer, such as a personal computer or a work station through the communicating driver 16. The data inputted into the computer 17 is stored and summed.

The light source driving circuit 42 supplies the light sources 41 with the electrical power to activate the same to thereby emit the beams in accordance with the control of the control mechanism 15. When a main switch (not shown) is actuated, the control mechanism 15 actuates the light source driving circuit 42 to thereby turn the light sources 41 ON. The time in which the light sources 41 are activated is selected to be a predetermined value by the light source driving circuit 42 or the control mechanism 15.

Also, when the main swatch is turned ON, the control mechanism 15 actuates the CCD driving circuit 6. Horizontal driving pulses and vertical driving pulses are outputted from the CCD driving circuit 6 to the CCD 43 to control the accumulation and transfer of the electric charges in the CCD 43.

The CCD driving circuit 6 generates clock signals and outputs composite signals (composite clock signals) of the clock signals and horizontal and vertical synchronization signals to the control mechanism 15.

The image signals (analog signals) for each picture element, successively outputted from the CCD 43 of the data reading portion 4 are amplified by the amplifier circuit 8 and converted to digital signals which are then inputted to the binary code circuit 10.

The digital image signal corresponding to each picture element is compared with threshold data and converted to binary data in the binary code circuit 10. The binary data obtained are inputted into the memory 12 at a predetermined address through the address counter incorporated in the control mechanism 15. The address counter is driven in accordance with the composite clock signals inputted thereto from the CCD driving circuit 6.

The data stored in the memory 12 is successively read in accordance with designated addresses in the built-in address counter, so that the calculating portion of the control mechanism 15 carries out the processing of the image data for one picture plane, such as a detection of the profile (selection of data on the data symbols 38 only), a correction of a dropout error, or the rotation, etc. The processed data is then decoded into data corresponding to the system of the data symbols by a decoder incorporated in the control mechanism 15. The decoded data is outputted to a host computer 17 through the communicating driver 16.

Furthermore, the present invention is not limited to the illustrated embodiments. The present invention can be applied to a different size of rectangular data reading area. The rectangular data reading area referred to herein includes a square data reading area. Moreover, the major sides and the minor sides of the rectangular data reading area in the illustrated embodiment can be interchanged.

Several examples of the luminance distribution will be discussed below.

Figure 2:
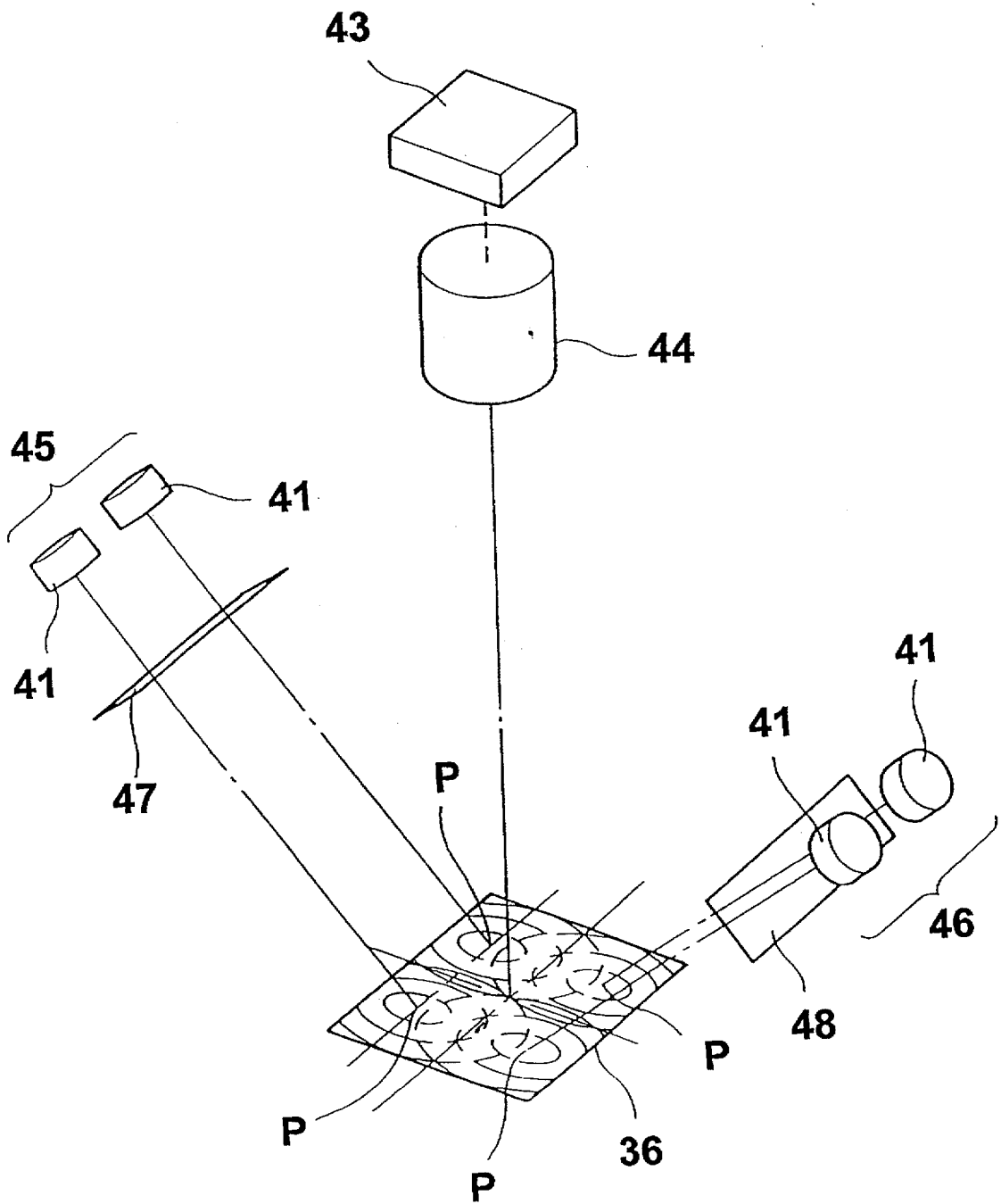
FIG. 2 is a schematic isometric view of a lighting apparatus and a data reading portion, according to the first three embodiments of the present invention.

The luminance distributions of the data reading area were measured using the lighting apparatus shown in FIG. 2. The four light emitting diodes used as the light sources were identical to each other. Their orientation property is shown in FIG. 6. The size of the data reading area was as follows; Lx=18.5 mm and Ly=24.5 mm.

Other experimental conditions in the examples are described below.

FIGS. 8a through 12b show examples of luminance distribution of the data reading area 36 (FIG. 3) which is illuminated with the beams emitted from the light sources according to the present invention. The ordinate represents the level of the video signals (unit: IRE), and the abscissa represents the position of the illumination points on the median lines or the lines mentioned above, respectively.

In FIGS. 8a through 12b, the upper curves show luminance distributions for the lines "q" and "n" which connect the center points P of each illumination, and the lower curves show luminance distributions on the median lines "mx" and "my", respectively. FIGS. 8a, 9a, 10a, 11a and 12a show the luminance distributions of the data reading area 36 in the major side direction (horizontal direction) thereof, and FIGS. 8b, 9b, 10b, 11b and 12b show the luminance distributions of the data reading area 36 in the minor side direction (vertical direction) thereof, respectively. It should be appreciated that the uniformity of illumination over the data reading area 36 is improved as the distance between the upper and lower curves decreases and the curves become more straight.

EXAMPLE 1:

Center points P of illumination: $\Delta Lx=0.2Lx$, $\Delta Ly=0.2Ly$
Incident angles $\theta$: 40°

EXAMPLE 2:

Center points P of illumination: $\Delta Lx=0.2Lx$, $\Delta Ly=0.2Ly$
Incident angle $\theta$: 50°

EXAMPLE 3:

Center points P of illumination: $\Delta Lx=0.2Lx$, $\Delta Ly=0.2Ly$
Incident angle $\theta$: 45°

Comparative Example A:

Center points P of illumination: $\Delta Lx=0$ (i.e., the center points P of illumination are located on the major sides of the rectangular data reading area), $\Delta Ly=0.2Ly$
Incident angle $\theta$: 45°

Comparative Example B:

Center points P of illumination: $\Delta Lx=0.35 Lx$, $\Delta Ly=0.2Ly$
Incident angle $\theta$: 45°

As can be seen from the experimental results mentioned above, in example 1, there was only a small difference in the brightness between the lines "q", "n" and the corresponding median lines, and the difference in the luminance between the brightest portion and the darkest portion was about 10IRE. Also, in the example 2 shown in FIGS. 9a and 9b, the difference in the luminance between the brightest portion and the darkest portion was about 10IRE. Consequently, in examples 1 and 2, a substantially uniform brightness over the whole area was obtained.

Figure 10A:
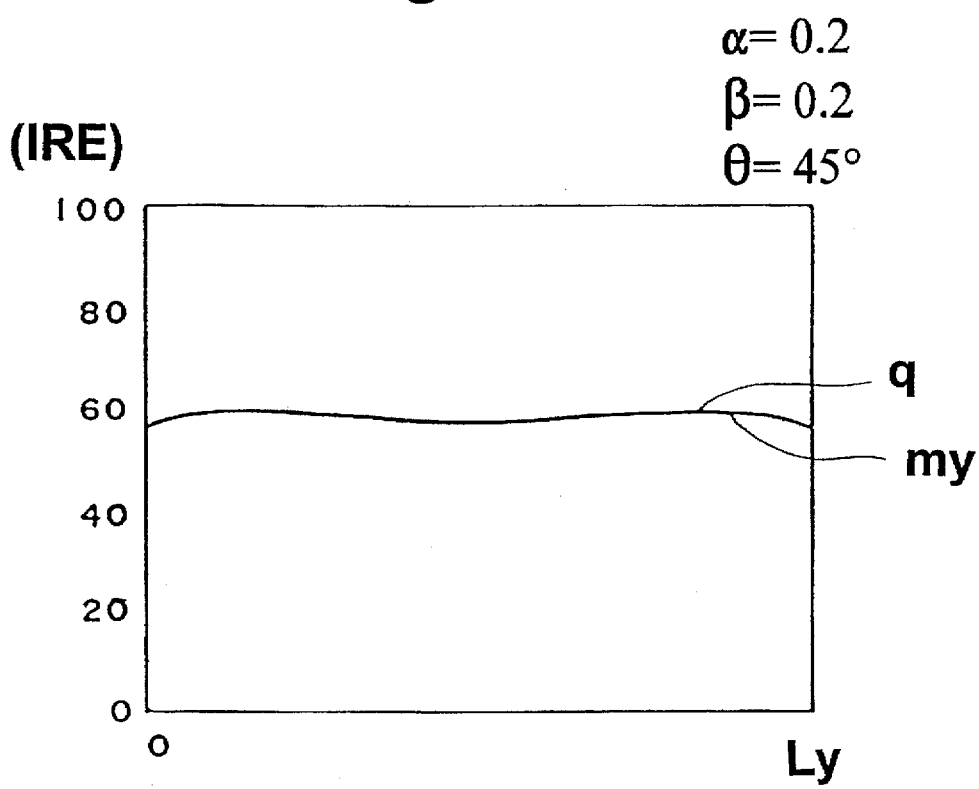
FIGS. 10a and 10b are diagrams of a third example of a luminance distribution on a data reading area of a data reader, in a major direction and a minor direction, according to a third embodiment of the present invention, respectively.
Figure 10B:
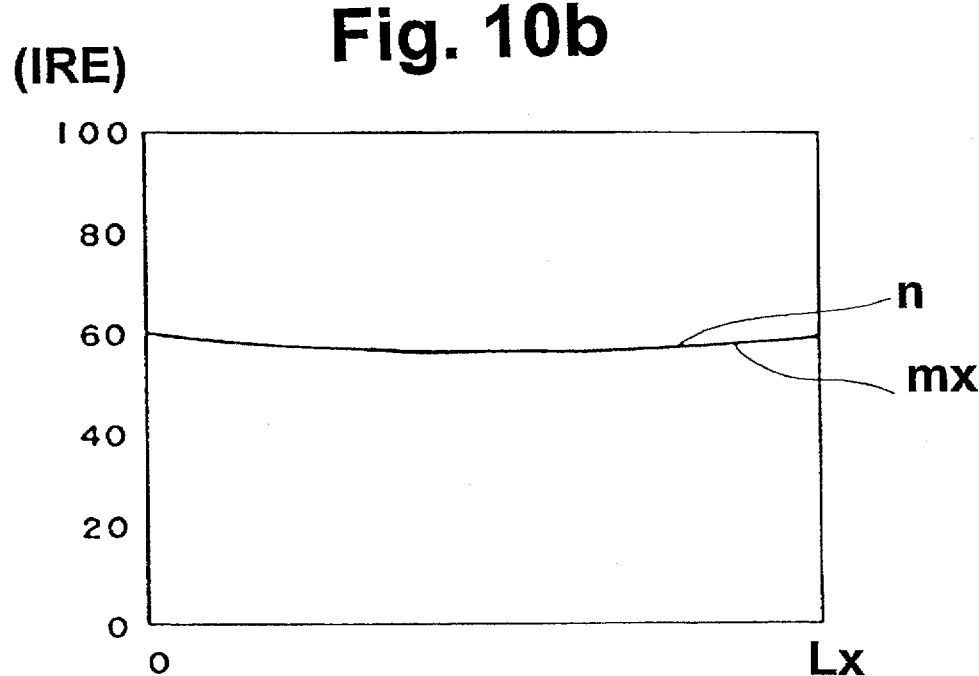

In example 3 shown in FIGS. 10a and 10b, there was little difference in the brightness between the lines "p", "n" and the corresponding median lines, and there was little difference in the luminance between the lines "p" and "n".

Figure 11A:
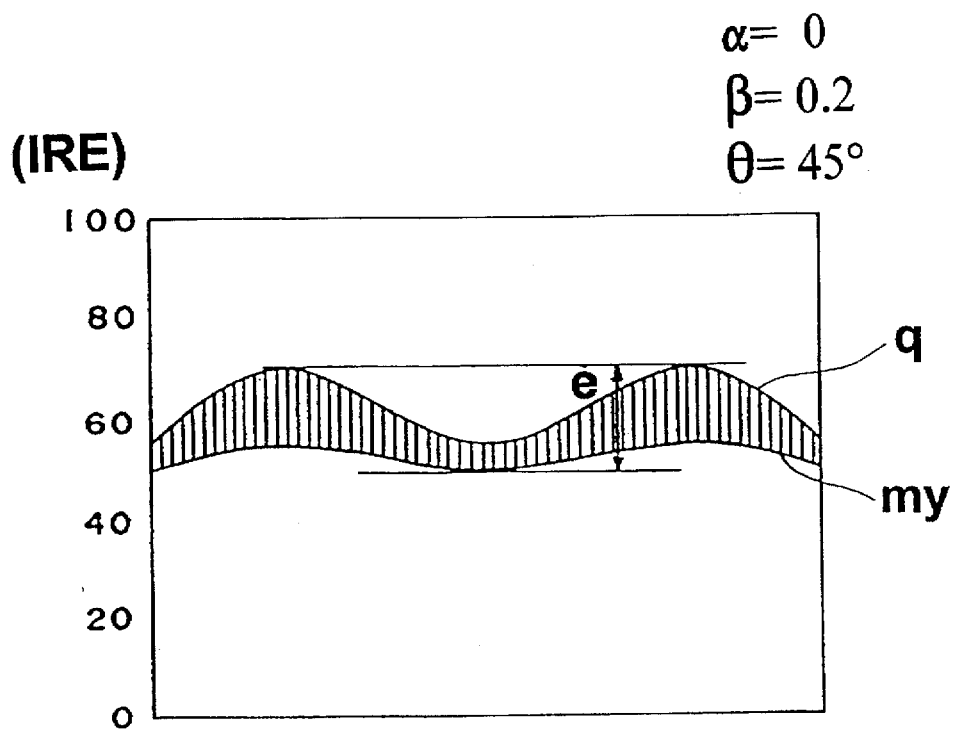
FIGS. 11a and 11b are diagrams of a comparative example of a luminance distribution on a data reading area of a data reader, in a major direction and a minor direction, respectively.
Figure 11B:
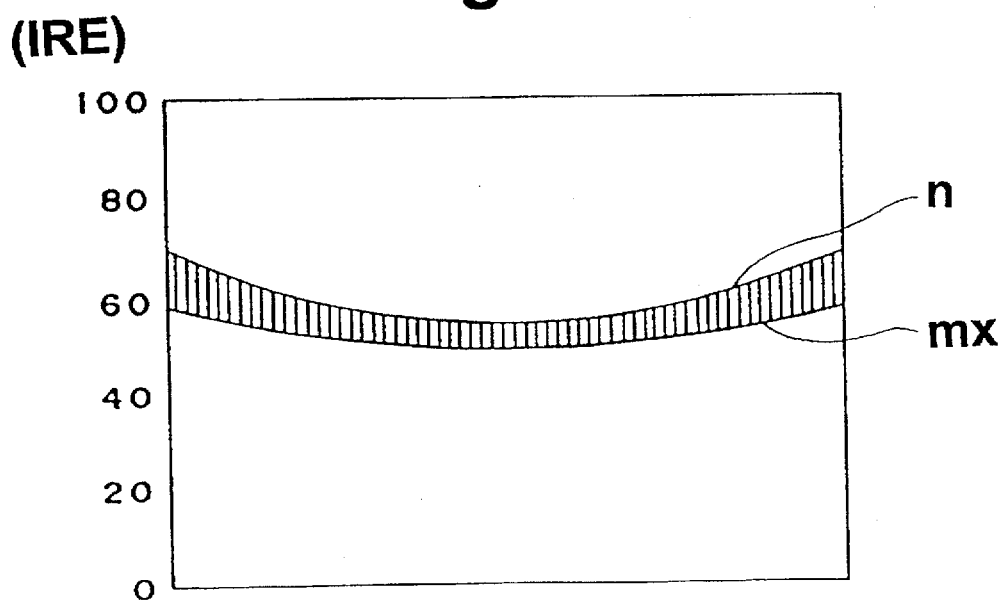
Figure 12A:
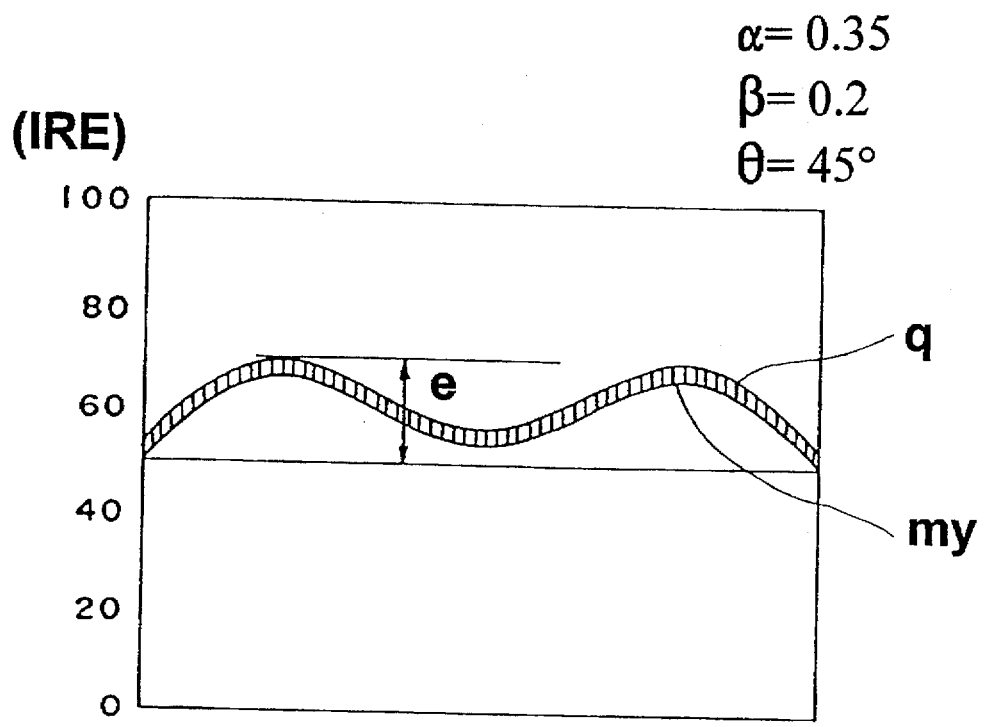
FIGS. 12a and 12b are diagrams of another comparative example of a luminance distribution on a data reading area of a data reader, in a major direction and a minor direction, respectively.
Figure 12B:
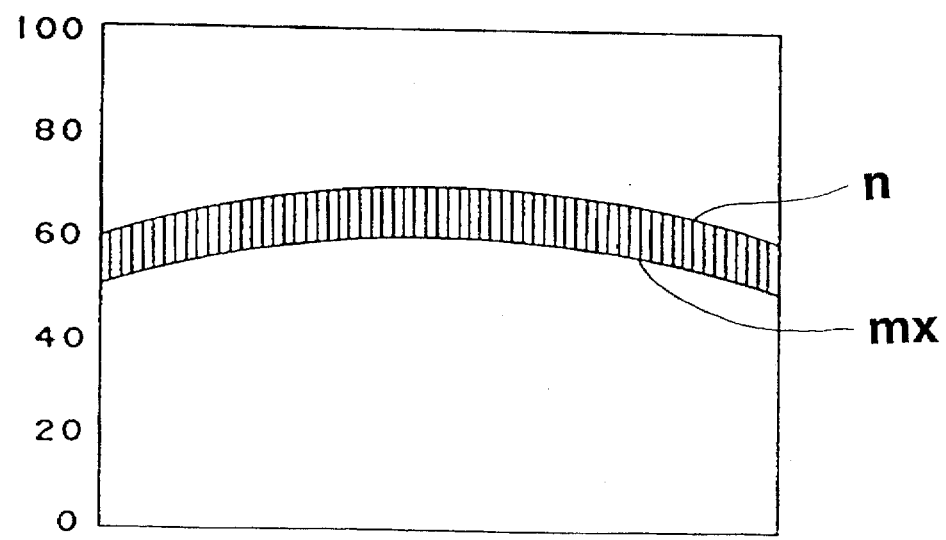

Looking at the comparative example A shown in FIGS. 11a and 11b, the luminance distribution is such that the center portions are dark and the difference in the brightness between the dark portion and the bright portion is around 20IRE. Also, in the comparative example B shown in FIGS. 12a and 12b, the center portions and the edge portions are dark, and the difference in the brightness between the dark portion and the bright portion is approximately 20IRE. Consequently, it can be appreciated that a non-uniform illumination is obtained in the comparative examples A and B.

It was experimentally confirmed that the same results as the foregoing were obtained when the values of $\Delta Ly$ were replaced with 0.15Ly and 0.25Ly, respectively.

As can be understood from the above discussion, according to the present invention, the data reading area can be uniformly illuminated, to thereby correctly read the coded data. In particular, according to the present invention, the data reading area is not limited to being illuminated by only four light sources.

FIGS. 13 through 16 show other embodiments of the present invention. In the illustrated embodiment, each of the arrays 245 and 246 is provided with three light sources $241a_1$, $241b$ and $241a_2$. The light source arrays 245 and 246 are located above and along the major sides of the data reading area 36 in a data reading position. Although the diffusion systems are made of diffusion plates 247 and 248 having diffusion surfaces in the illustrated embodiment, the diffusion systems can be made, for example, of cylindrical lenses. Alternatively, if light sources having a weak direction determining capability are used, the diffusion systems can be dispensed. The directional property of the light sources $241a_1$, $241b$, and $241a_2$ is shown in FIG. 6.

The optical axes $249a_1$, $249b$ and $249a_2$ of the light sources $41a_1$, $241b$ and $241a_2$ which constitute the respective arrays 245 and 246 are parallel. Imaginary planes including the optical axes $249a_1$, $249b$ and $249a_2$ intersect the reference surface 37 of the data reading area 36 at a predetermined inclination angle. The intersection lines of the imaginary planes and the reference surface 37 are parallel with the major sides of the data reading area 36. The imaginary planes are inclined to increase the distance therebetween and the CCD 43.

The angle defined by the imaginary planes including the optical axes $249a_1$, $249b$ and $249a_2$ and the reference surface 37 is 30° to 60°, and preferably, 40° to 50°. When the angle is within this range, the reference surface 37 can be uniformly illuminated with the beams emitted from the lighting apparatus according to the present invention.

The intersection lines "q" formed by the intersection between the imaginary light planes and the reference surface 37 are parallel with the major sides of the rectangular data reading area 36 and the median line "my" of the minor sides of the data reading area 36. Furthermore, the optical axes $249a_1$, $249b$ and $249a_2$ intersect the lines "q" at right angles. The intersection points $Pa_1$, Pb and $Pa_2$ of the optical axes $249a$, $249b$ and $249a_2$ and the intersection lines "q" constitute the center points of illumination by the beams emitted from the respective light sources. In the arrangement of the light sources having the orientation property as mentioned above, the maximum luminance is obtained at the center points $Pa_1$, Pb and $Pa_2$ of illumination, on the assumption that the reference surface 37 is illuminated one at a time by one of the light sources.

When the beams emitted from the light sources 241 are transmitted through the diffusion plates 247 and 246, the beams are diffused to illuminate a predetermined zone of the data reading area 36.

The luminances of the light sources $241a_1$, $241b$ and $241a_2$ that constitute each array 245 or 246 are such that the luminances of the outer light sources $241a_1$ and $241a_2$ are identical to each other and larger (brighter) than the luminance of the intermediate light source $241b$.

If the beams are emitted individually by only the light source $241a_1$ the light source $241b$ or the light source $241a_2$, then the luminance on the reference surface 37 at the center points $Pa_1$ & $Pa_2$ of illumination would be larger than the luminance on the reference surface 37 at the center point Pb of illumination. Namely, the center points $Pa_1$ & $Pa_2$ of illumination are brighter than the center point Pb of illumination for the case where the beams are emitted individually. If all the light sources 241 are activated together, the beams emitted from the outer light sources $241a_1$ and $241a_2$ are diffused by the corresponding diffusion plates so as to illuminate a large area of the data reading area 36, from the edge portions to the center portions including the center points Pb of illumination. Consequently, the whole data reading area along the lines "q" can be uniformly illuminated. The same is true for the data reading area, for example, along the median line "my" parallel with the lines "q". Thus, the entirety of the data reading area can be uniformly illuminated.

If each of the arrays 245 and 246 is comprised of more than three light sources 241, the luminance of the outermost light sources is higher than the luminance of the inner light sources, so that the data reading area can be uniformly illuminated. If the light sources 241 of each array are spaced et a substantially equi-distance, it is preferable that the outermost light sources have an identical high luminance and the inner light sources have an identical low luminance. Preferably, the center points P of illumination are located in a symmetrical arrangement with respect to the median line "my".

Light sources having different fixed luminances or variable luminances (that can be varied by the control of the driving voltage applied thereto) can be used. Namely, in the latter case, the driving voltage to be applied to light sources whose luminance must be high is increased and the driving voltage to be applied to the light sources whose luminances must be low is decreased, respectively. In the illustrated embodiment, the driving voltage to be applied to the light sources $241b$ is selected to be lower than that to be applied to the light sources $241a_1$ and $241a_2$, so that the light intensity of the light sources $241b$ can be reduced without changing the orientation property.

Figure 13:
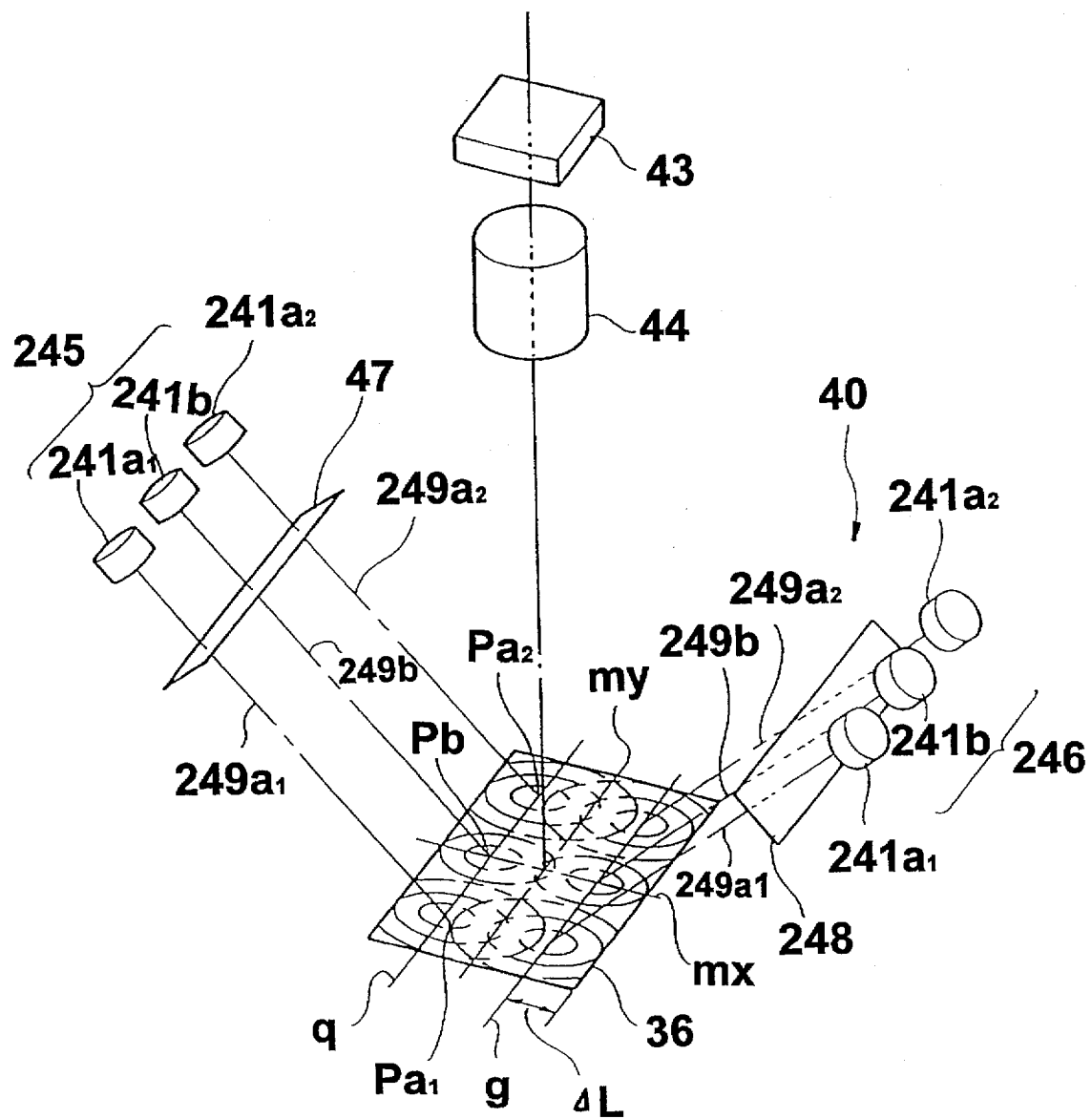
FIG. 13 is a schematic isometric view of a lighting apparatus and a data reading portion, according to a fourth embodiment of the present invention.

The lines "q" are spaced at a distance $\Delta L$ in the minor side direction from the major sides of the rectangular data reading area, as shown in FIG. 13. The value of $\Delta L$ is within the range of 0.1 to 0.34 times, and preferably, 0.15 to 0.25 times the length of the minor sides, so that the reference surface 37 of the data reading area 36 can be uniformly and two-dimensionally illuminated.

Figure 14:
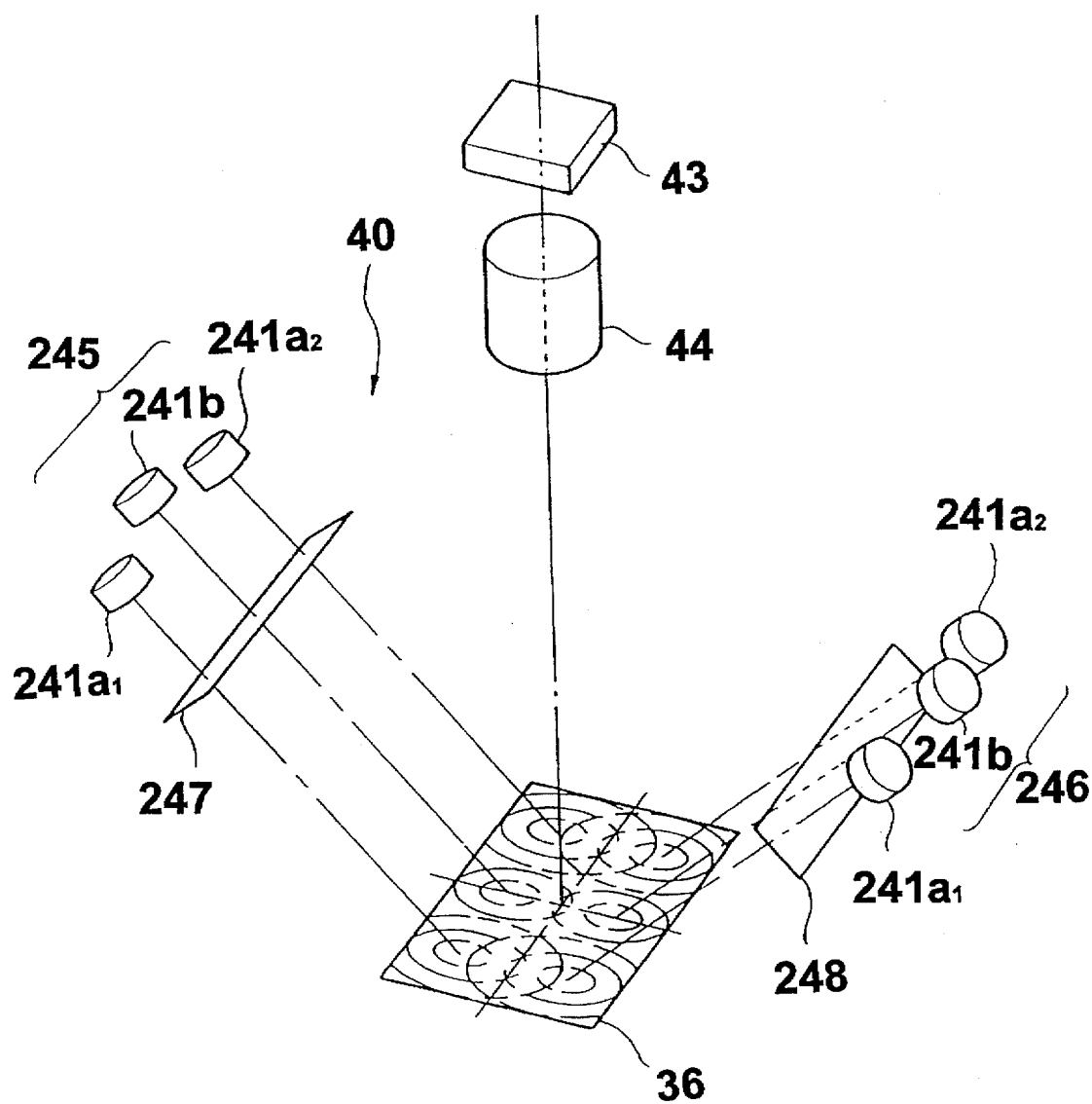
FIG. 14 is a schematic isometric view of a lighting apparatus and a data reading portion, according to a fifth embodiment of the present invention.

In the fifth embodiment shown in FIG. 14, the inner light source $241b$ in each array 245 or 246 that includes a plurality of light sources is located farther from the data reading surface 36 than the outer light sources $241a_1$ and $241a_2$. Namely, the distance of the light sources $241b$ from the data reading area 36 is longer than the distance of the light sources $241a_1$ and $241a_2$ from the data reading area 36. With this arrangement, the luminance at the center points Pb of illumination or in the vicinity thereof, illuminated by light emitted from the light sources $241b$ is smaller than the luminance at the center points Pa of illumination or in the vicinity thereof, illuminated by light emitted from the light sources $241a_1$ and $241a_2$.

Figure 15:
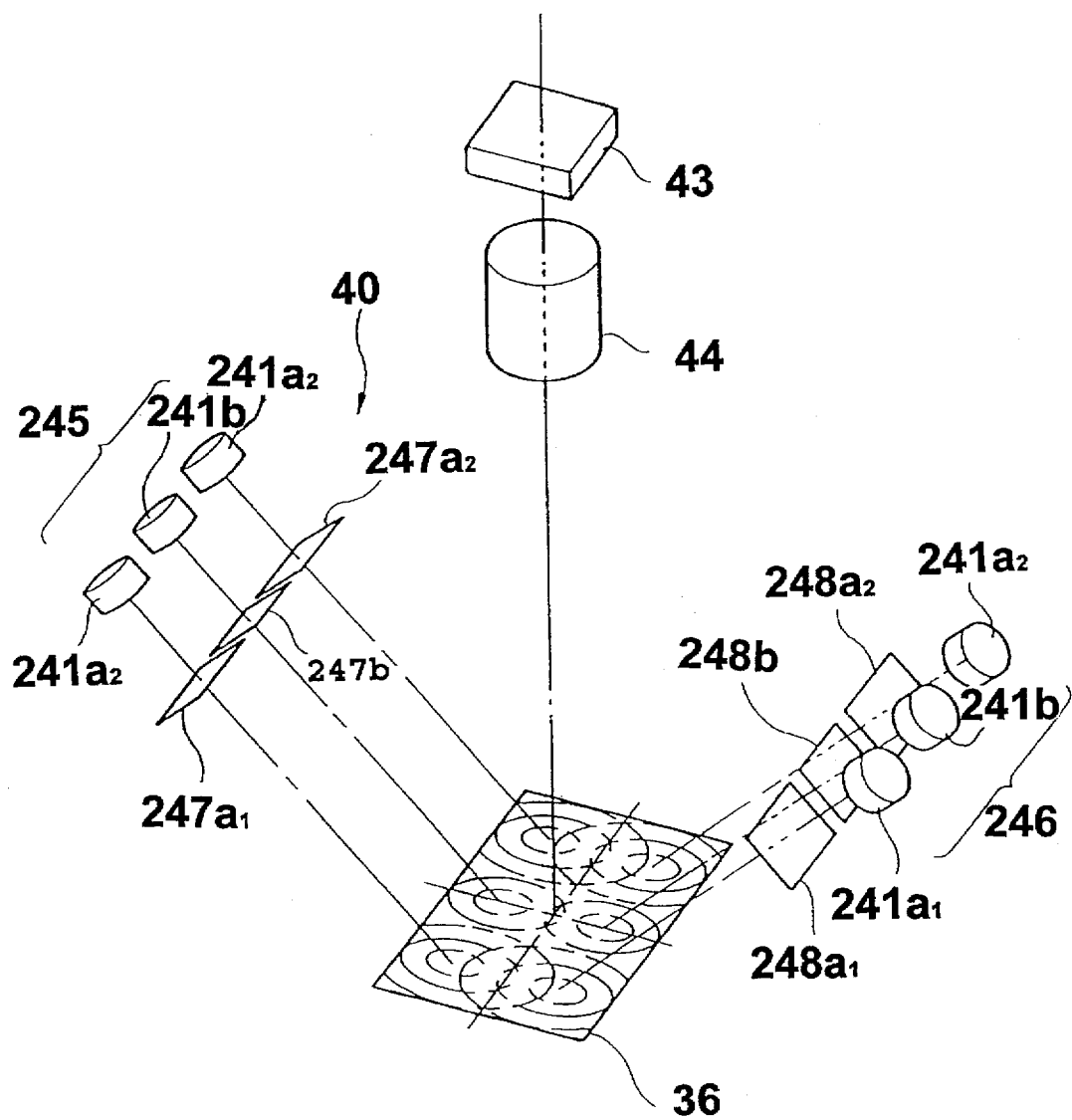
FIG. 15 is a schematic perspective view of a lighting apparatus and a data reading portion, according to sixth and seventh embodiments of the present invention.

In a sixth embodiment illustrated in FIG. 15, the separate diffusion plates 247 and 248 are provided for the respective light sources 241. Namely, there are diffusion plates $247a_1$, $247b$ and $247a_2$ corresponding to the light sources $241a_1$, $241b$ and $241a_2$ of the light source array 245 and diffusion plates $248a_1$, $248b$ and $248a_2$ corresponding to the light sources $241a_1$, $241b$ and $241a_2$ of the light source array 246, respectively. The inner diffusion plates $247b$ and $248b$ have a diffusability different from that of the outer diffusion plates $247a$ and $248a$. In the illustrated embodiment, the intermediate diffusion plates $247b$ and $248b$ have a higher diffusability than the diffusability of the outer diffusion plates 247a and 248a, so that the luminance of light emitted by the light sources 241b is lower than that by the light sources $241a_1$ and $241a_2$.

In a modified (seventh) embodiment, it is possible to provide optical filters that constitute a beam attenuating mechanism in the optical paths of the light sources 241b to attenuate the quantity of the beams reaching the center points Pb of illumination.

In the fifth, sixth and seventh embodiments mentioned above, all the light sources to be used can be of an identical type.

Several examples of the luminance distribution will be discussed below.

The luminance distributions of the data reading area were measured, using the fourth embodiment of the lighting apparatus shown in FIG. 13. The six light emitting diodes used as the light sources were identical to each other, The orientation property thereof is shown in FIG. 6. The size of the data reading area was as follows; Lx(minor sides)=18.5 mm, and Ly(major sides)=24.5 mm.

Other experimental conditions in the examples were described below.

Figure 16A:
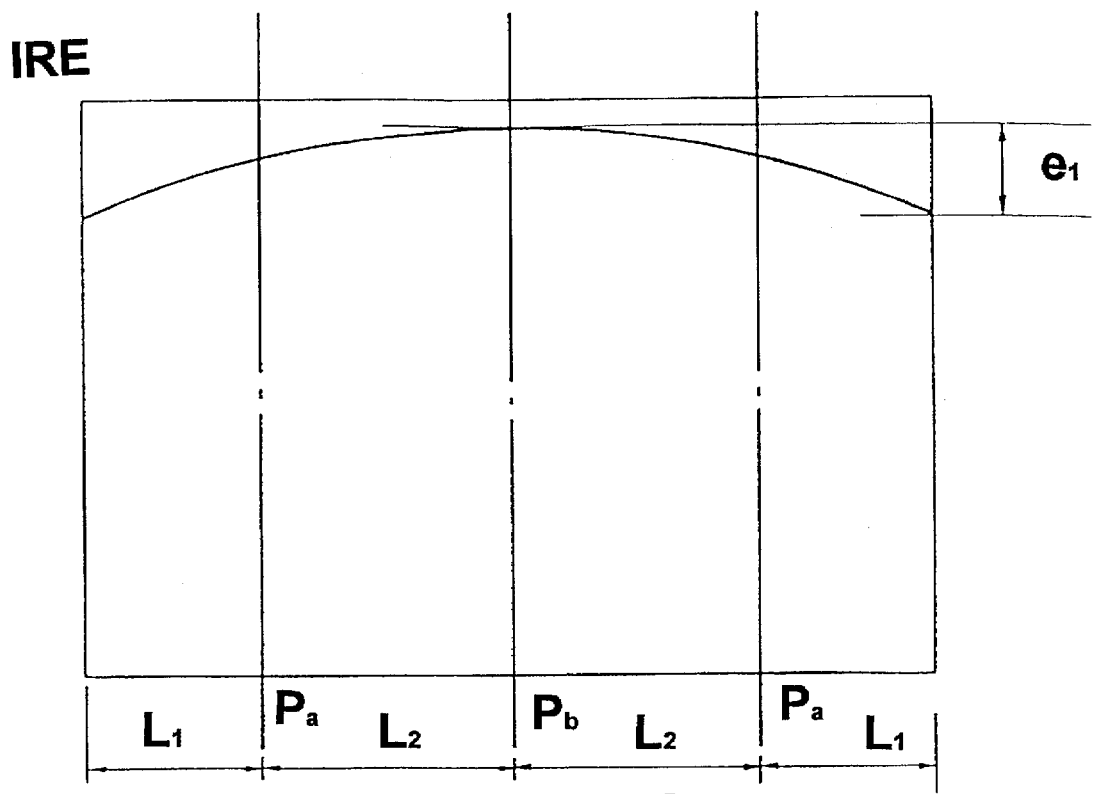
FIG. 16a is a diagram of a comparative example of the luminance distribution on a data reading area of a data reader.
Figure 16B:
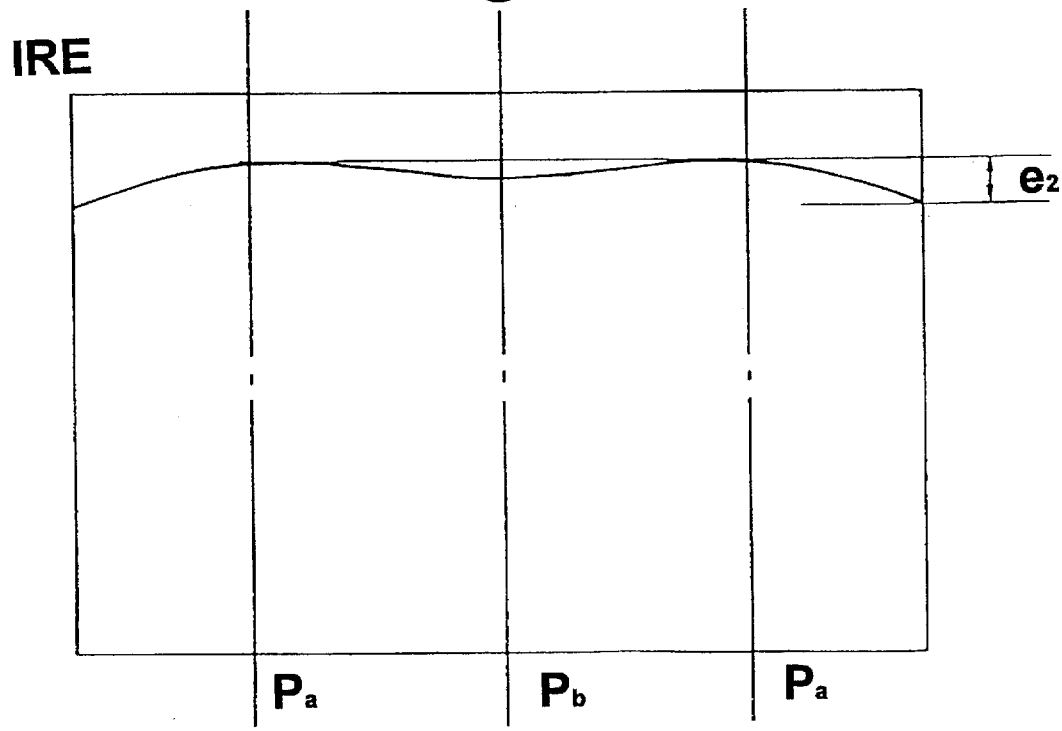
FIG. 16b is a diagram of an example of a luminance distribution on a data reading area of a data reader, according to the present invention.
Figure 17:
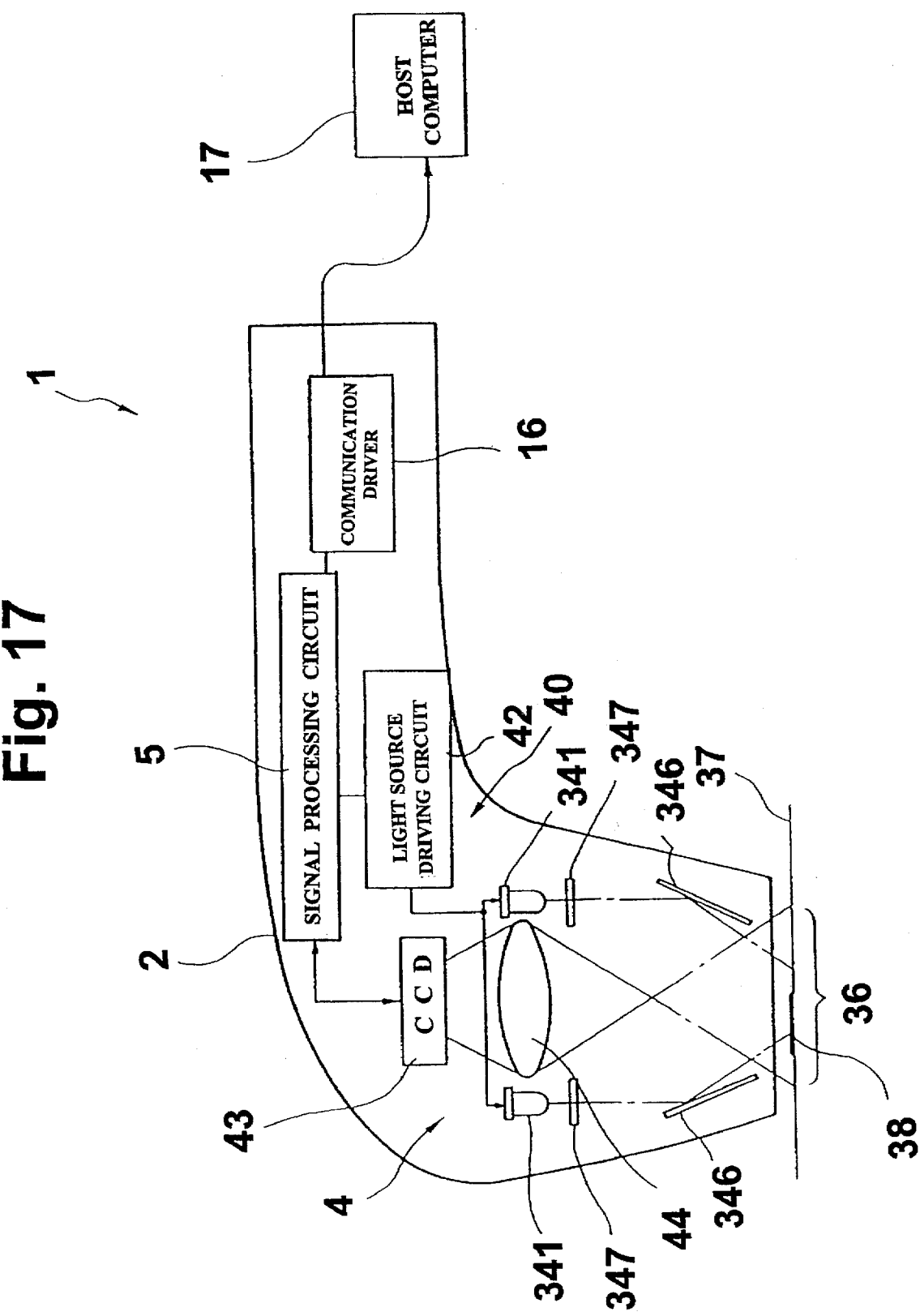
FIG. 17 is a schematic side sectional view of a data symbol reader according to the present invention.

FIGS. 16a and 16b show examples of luminance distribution of the data reading area 36 (FIG. 3) which is illuminated with the beams emitted from the light sources according to the present invention. The ordinate represents the level of the video signals (unit: IRE), and the abscissa represents the position of the illumination points on the lines "q" mentioned above, respectively. The center points P of illumination were such that the distance $L_1$ between the minor sides of the data reading area 36 and the center points Pa of illumination and the distance $L_2$ between the center points Pa of illumination and the center points Pb of illumination satisfy the relationship defined by ($L_1$: $L_2$=5:7).

The distance of the center points $Pa_1$, Pb and $Pa_2$ of illumination from the major sides of the data reading area 36 were 0.2 times that length of the minor sides and the angle of the optical axes of the light sources 241 with respect to the normal line to the reference surface 37 was 45°.

The curves in FIGS. 16a and 16b show the luminance distribution on the lines "q". It should be appreciated that the uniformity of illumination over the data reading area 36 is improved as the curves become approximately straight lines.

Comparative Example C:

The luminance of the light sources 241b was identical to the luminance of the light sources $241a_1$ and $241a_2$. The luminance at the center points Pb of illumination when only the light sources 241b were activated was identical to the luminance at the center points Pa of illumination when only the associated light sources $241a_1$ and $241a_2$ were activated. The results are shown in FIG. 16a.

EXAMPLE 4:

A resistor was inserted in an output line of the light source driving circuit to reduce the driving voltage of the light sources 241b, so that the luminance of the light sources 241b were lower than the luminance of the remaining light sources $241a_1$ and $241a_2$. The luminance at the center points Pb of illumination when only the light sources 241b were activated was smaller, by approximately 17%, than the luminance at the center points Pa of illumination when only the associated light sources $241a_1$ and $241a_2$ were activated. The results are shown in FIG. 16b.

As can be seen in FIG. 16a, in the comparative example, the luminance at the center portion of the data reading area is higher than that at the peripheral portion. The difference $e_1$ in the luminance between the bright portion and the dark portion in the comparative example shown in FIG. 16a is larger than the corresponding difference $e_1$ in the example 1 shown in FIG. 16b. Namely, the lines "q" on the data reading area 36 can be more uniformly illuminated in the present invention than in the comparative example. It was experimentally found that the difference in the luminance on the median lines "mx" (in the minor side direction) perpendicular to the lines "q" was smaller than the above-mentioned difference $e_2$ in the major side direction.

EXAMPLE 5:

The light sources having an identical luminance and optical axes inclined with respect to the reference surface at the same inclination angle as that in example 4 mentioned above were used. The light sources 241b were located farther from the reference surface 37 than the other light sources $241a_1$ and $241a_2$ to reduce the luminance at the center points Pb in order to give substantially the same luminance at the data reading surface 36 to be identical to the luminance in example 4. Substantially the same results as those in example 4 were obtained.

EXAMPLE 6:

The diffusion plates were separately provided with separate light sources. The difffusability of the diffusion plates 247b and 248b of the light sources 241b was larger than the diffusability of the remaining diffusion plates to reduce the luminance at the center points Pb in order to give substantially the same luminance at the data reading surface 36 as in example 4. Consequently, substantially the same results as in example 4 were obtained.

EXAMPLE 7:

Filters were provided between the light sources 241b and the reference surface 37 to attenuate the quantity of light from the light sources 241b, so that the luminance at the center points Pb would give substantially the same luminance as in example 4. Consequently, substantially the same results as in example 4 were obtained.

As can be understood from the foregoing, according to the present invention, the two-dimensional symbols in a data reading area can be uniformly illuminated, to allow the coded data to be read correctly.

The data reading area can be more uniformly illuminated by the inclination of the optical axes of the light sources with respect to the reference surface of the data reading area and by the location of the center points of illumination spaced at a predetermined distance from the minor sides of the rectangular data reading area.

Figure 18:
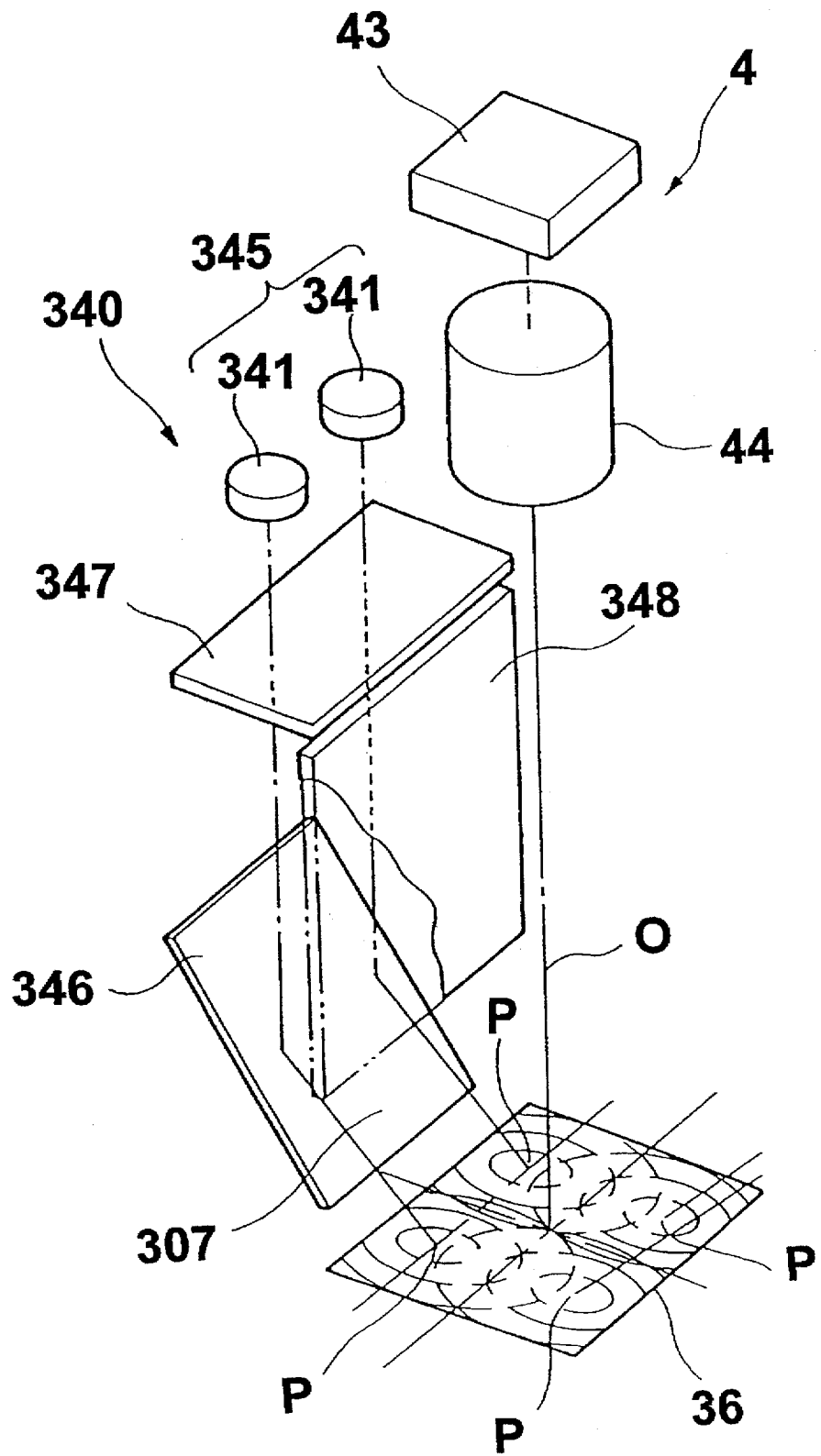
FIG. 18 is a schematic isometric view of a lighting apparatus and a data reading portion, according to an eighth embodiment of the present invention.

The eighth embodiment of the lighting apparatus according to the present invention will be described below with reference to FIGS. 18 and 19. The lighting apparatus 340 includes a plurality of light sources 341, diffusion plates 347 which constitute an optical diffusion system, and shading plates 348 which constitute a shading means.

In the illustrated embodiment, there are, on the opposed sides of the CCD 343, two arrays 345, each having two light sources 341. Only one of the arrays 345 is shown in FIG. 18. The CCD 43 is provided with a light receiving surface perpendicular to a line O normal to the reference surface 37 of the data (symbol) reading area The optical axis of the light incident upon the CCD 43 is parallel with the normal line O. The light sources 341 are arranged such that the optical axis of the light that has been emitted from the light sources 341 but has not yet reached the guiding optical system is substantially parallel with the optical axis of the light incident upon the CCD 43, and accordingly, the line to the reference surface 37 (i.e., α≈0).

The arrays 345 are located along a pair of opposed parallel sides (major sides in the illustrated embodiment) of the rectangular data reading area 36. The mirrors 346 are provided in the optical paths of the light of emitted from the light sources 341 and along the major sides of the data reading area 36.

There are diffusion plates 347 between the light sources 341 and the mirrors 346. Shading plates 348 are provided below the diffusion plates 347 on the side adjacent to the data reading area 36. The shading plates 348 prevent the light emitted from the light sources 341 from being directly made incident upon the data reading area 36.

When the beams emitted from the light sources are transmitted through the diffusion plates 347, the beams are diffused so as to illuminate a large area of the data reading area 36 and make the luminance substantially constant within the illumination range.

The surfaces of the shading plates 348 facing the mirrors 346 can be mirror surfaces. In this case, the beams are reflected by the mirror surfaces of the shading plates 348 and by the mirrors 346 toward the data reading area 36. Consequently, no attenuation of the brightness due to the partial absorption of the beams by the shading plates occurs, resulting in an effective utilization of the beams emitted from the light sources. Moreover, the shading plates 348 prevent the light diffused by the diffusion plates 347 from being directly incident upon the data reading area 36.

Thus, the illumination beams are made incident upon the data reading area 36 through gaps formed below the shading plates 348. The gaps also define the emission portions 307 through which the illumination beams are emitted from the lighting apparatus 430. Since the emission portions 307 are disposed close to the reference surface 37 of the data reading area 36, the incident angle β of the bests incident upon the data reading area 36 (i.e., the angle of the optical axes of the beams with respect to the normal lines to the reference surface 37 of the data reading area 36) can be increased to some extent, so that no image of the light sources can be formed on the CCD 43. The increase in the incident angle β also contributes to a uniform illumination of the symbol data reading area 36. The incident angle β is selected to be approximately 30° to 60°, and preferably, 40° to 50°.

In particular, the incident points of the beams emitted from the light sources 341 upon the reference surface of the date reading area 36, i.e., the center points P of illumination are preferably located at a distance of 0.1 to 0.34 times the length of the sides (minor sides) of the data reading area perpendicular to the major sides thereof, from the major sides. If the distance is within the range of 0.1 to 0.34 times the length of the minor sides, a more uniform luminance can be obtained over the whole data reading area.

Figure 19:
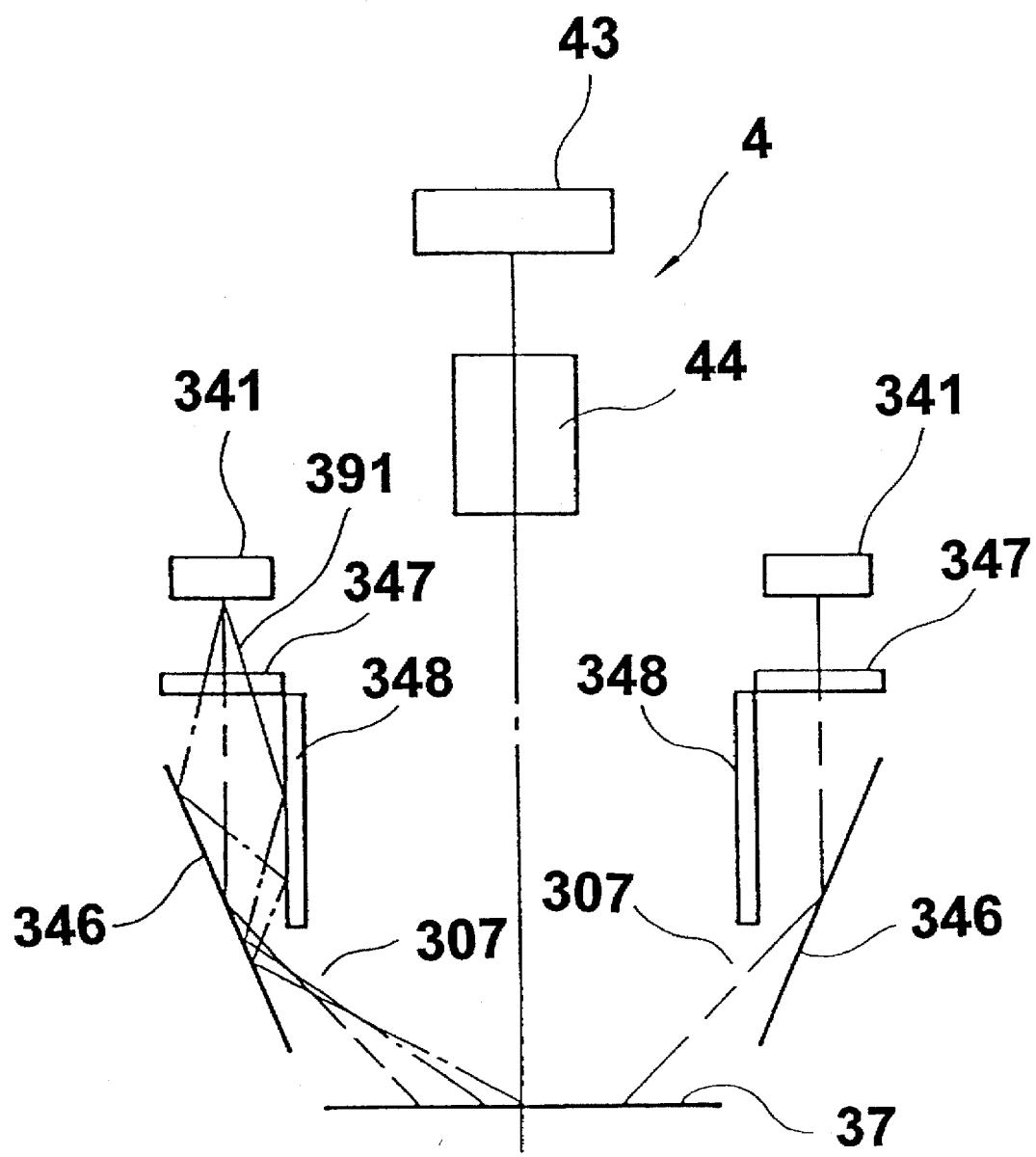
FIG. 19 is a schematic side elevational view of a lighting apparatus and a data reading portion, according to the eighth embodiment of the present invention.

When the surfaces of the shading plates 348 that face the corresponding mirrors 346 are mirror surfaces, as shown in FIG. 19, the diffusion range of the beams emitted from the light sources 341 is expanded, so that a larger area of the reference surface can be uniformly illuminated. For instance, the beam (optical axis) indicated at 391 in FIG. 19 is reflected by the mirror surface of the shading plate 348 and is then reflected by the mirror 346 to reach the vicinity of the center portion of the reference surface 37. Hence, the beams emitted from the light sources 341 can be effectively utilized as illumination light. Alternatively, the reflecting surfaces of the mirrors 346 and the mirror surfaces of the shading plates 348 can be replaced with diffusable reflecting surfaces.

In the illustrated embodiment, the light sources 341 have a substantially identical luminance and the directional (i.e., orientation) property thereof is shown in FIG. 6.

In the arrangement as discussed above, the angle α defined by the optical axis of the beams incident upon the CCD 43, and accordingly, the normal line O to the reference surface 37 and the optical axis of the beams transmitted through the diffusion plates 347 is approximately 0 (α≈0). Namely, the light sources 341 are arranged such that the above-mentioned two optical axes are substantially parallel with each other.

With this arrangement, the light sources 341 can be disposed close to the CCD 43 to realize a compact lighting apparatus 340.

If the light sources 341 are arranged to satisfy the relationship of α<β, the lighting apparatus 340 and accordingly the data symbol reading apparatus 1 can be made small end compact. The value of α is not necessarily equal to approximately 0. Namely, the optical axis of the beams incident upon the CCD 43 and the optical axis of the beams transmitted through the diffusion plates 347 can be relatively inclined.

Different embodiments of the present invention will be discussed below.

Figure 20:
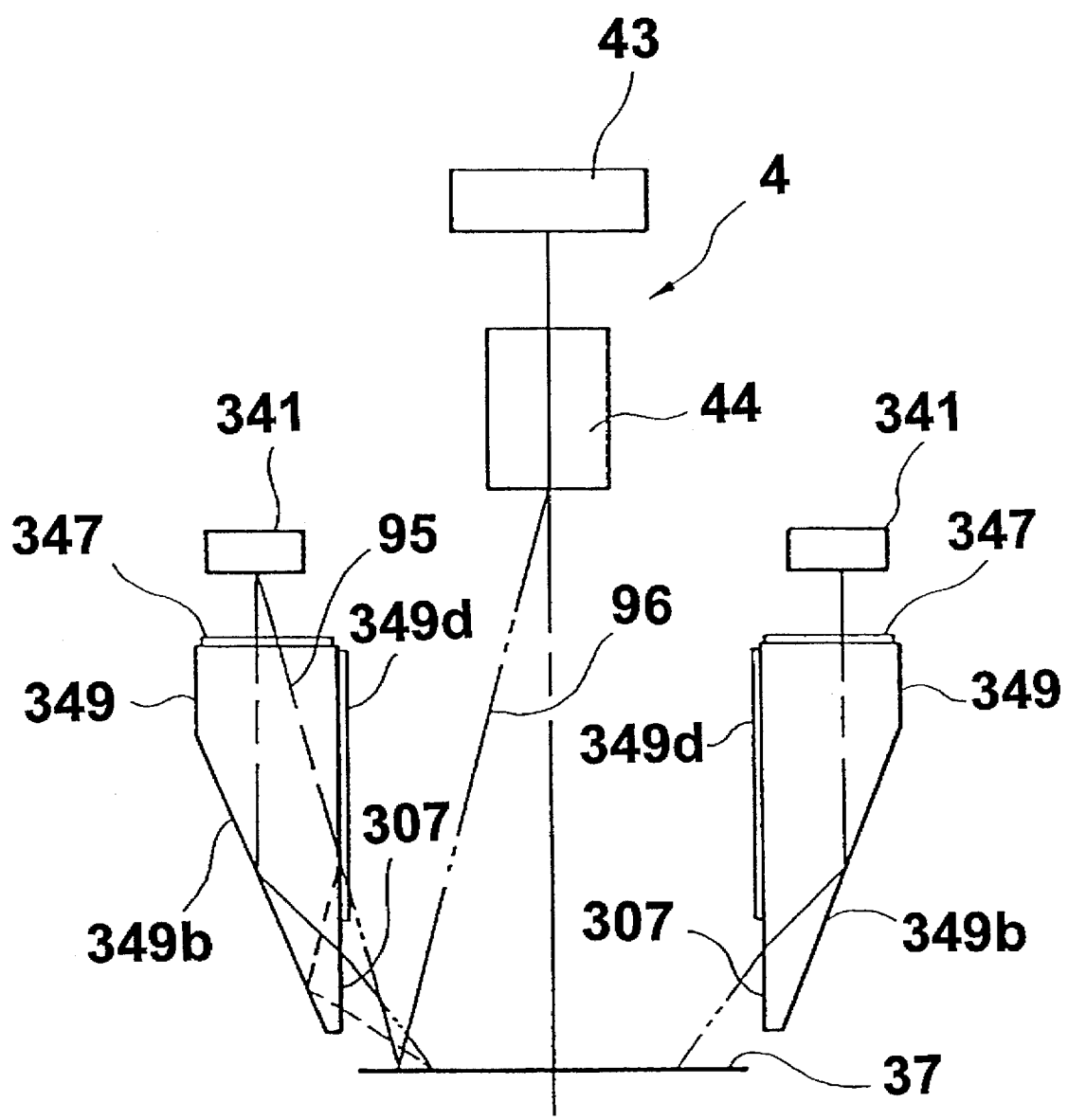
FIG. 20 is a schematic side elevational view of a lighting-apparatus and a data reading portion, according to ninth embodiment of the present invention.
Figure 21:
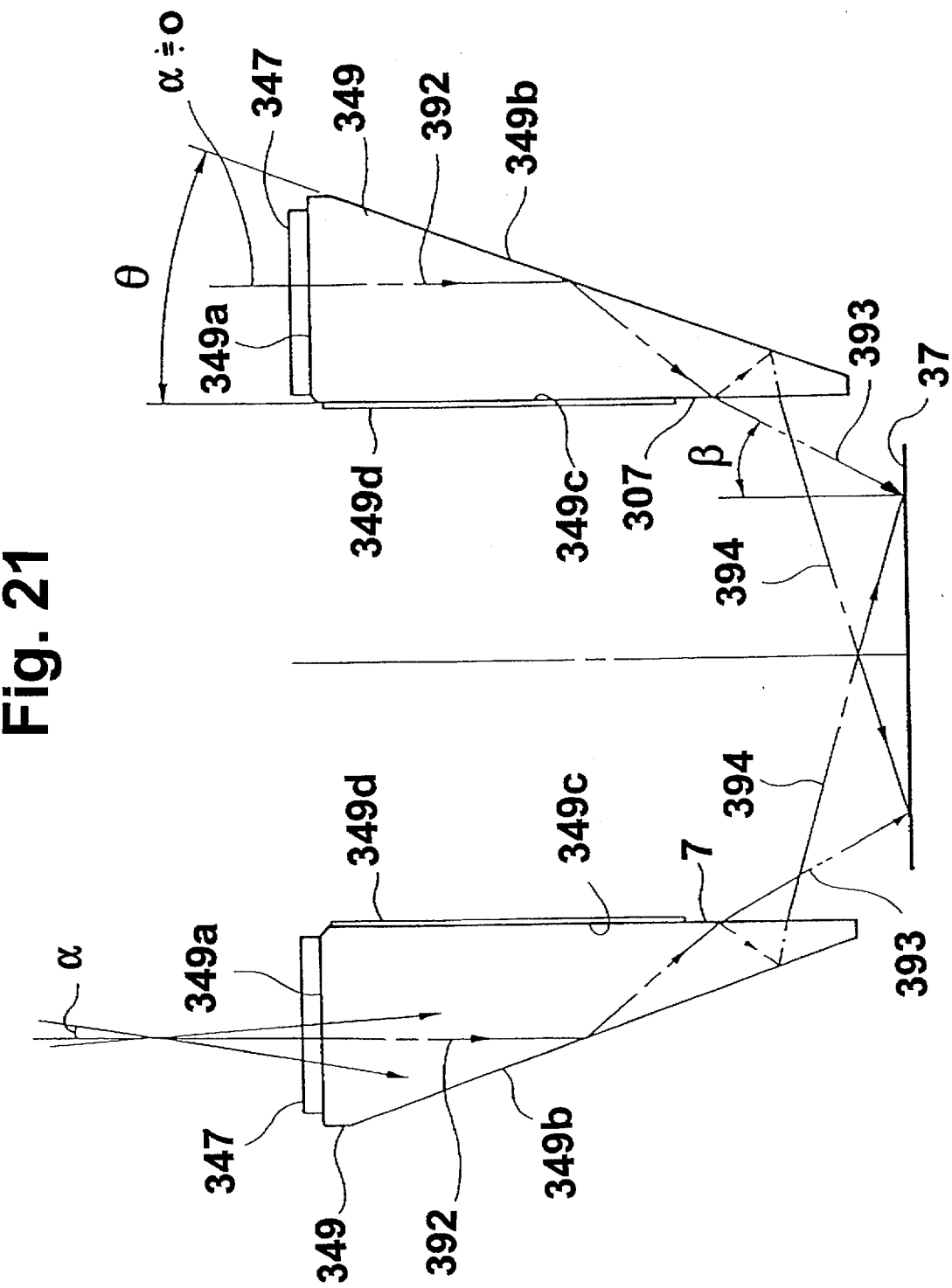
FIG. 21 is an enlarged side elevational view of optical paths of beams passing through prisms for the lighting apparatus shown in FIG. 20.

In a ninth embodiment illustrated in FIGS. 20 and 21, the guiding optical systems is each comprised of a prism 349 which is provided with an incident surface 349a, a reflecting surface 349b, and an emitting surface 349c. The incident surface 349a is provided with a diffusion plate 347 adhered thereto, that could be identical to the diffusion plate 47 in the first embodiment.

In the embodiments, an incident surface means a plane to which the light from the light source is incident.

The prisms 349 can be made of, for example, plastics, such as acrylic resin or polycarbonate, etc., or various kinds of glasses. The refractive index of the prisms 349 is preferably 1.4 to 1.6, and preferably, about 1.5.

The beams emitted from the light sources 341 are transmitted through the diffusion plates 347 and made incident upon the prisms 349 through the incident surfaces 349a. Thereafter, the beams are reflected by the reflecting surfaces 349b and emitted from the emitting surfaces 349c as a first emission light. At the emitting surfaces 349c, a part of the light is reflected thereby and returned to the inside of the prisms 349. The return beams are then reflected by the reflecting surfaces 349b and emitted through the emitting surfaces 349c as a second emission light. In FIG. 21, the optical axes of the incident beams, the first emission light and the second emission light are designated by 392, 393 and 394, respectively.

Due to the function of the prisms, the first emission lights (optical axis 393) are made incident upon the data reading area 36 at the portions thereof adjacent to the prisms 349, and the second emission lights (optical axis 394) reach the opposite edge portions of the data reading area 36 that are located far from the associated prisms 349. Hence, one group of rays emitted from the one prism can be made incident upon a large area of the data reading area 36 to illuminate therein, so that a uniform luminance distribution can be obtained within the reference surface 37.

Although the diffusion plates 347 are superimposed on the incident surfaces 349a of the prisms 349 in the illustrated embodiment, it is possible to form the incident surfaces 349a or the emitting surfaces 349c of the prisms as diffusable surfaces that constitute the diffusion means, in place of the diffusion plates 347. Moreover, the reflecting surfaces 349b of the prisms 349 can be formed as diffusable surfaces. With this alternative, the number of the components can be reduced and the manufacturing cost can be minimized.

The upper portion of the emitting surfaces 349c can be subjected to a surface treatment to prevent light from passing through. For example, the upper portions of the emitting surfaces 349c are provided with optical shading layers coated or evaporated thereon, or optical shading films can be applied applied to make the shading mechanism 349d. The shading mechanism 349d can be realized for example by a mirror surface, a light absorbing surface, a half mirror, or an optical filter, having an optional transmittance. In this case, the lower portions of the emitting surfaces 393 on which no shading layer is provided constitute the emitting portions 307 of the illumination light.

If the shading mechanism is embodied by the mirror surfaces, then repetitive reflections of the light occur between the mirror surfaces and the reflecting surfaces 349b, and accordingly, the illumination light emitted from the light sources can be effectively utilized to increase the luminance of the reference surface 37 and enhance the uniformity of the illumination.

Even in case of an absence of the shading mechanism, since the beams (represented by the beam 395) which are incident upon the emitting surfaces 393 from the inside of the prisms 349 at an angle above the critical angle are totally reflected by the emitting surfaces, there is no possibility that the light from the light sources 341 can directly be incident upon the reference surface 347, so that the light reflected thereby reaches the CCD 43, thus leading to a formation of spurious images of the light sources. Namely, no direct light along the optical axis (beam) 396 occurs.

When the prisms 349 are used as the guiding optical system as mentioned above, not only can the number of the components be reduced, but also the illumination efficiency can be increased to thereby create a more uniformly illuminated data symbol reading area 39. Note that the inclination angle θ of the mirror 346 and the reflecting surfaces 349b of the prisms 349 is preferably approximately 15° to 30°.

Figure 22:
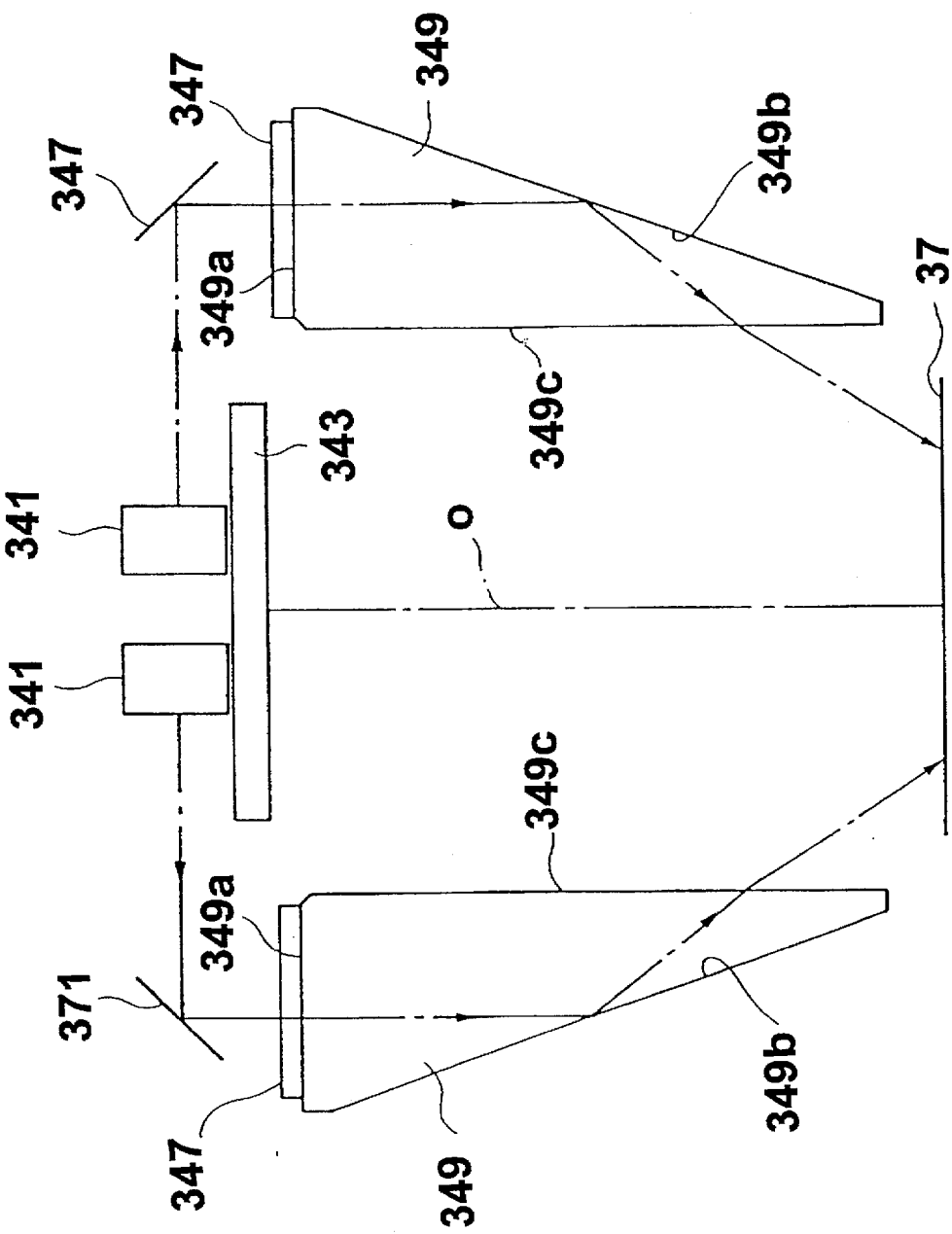
FIG. 22 is a schematic side elevational view of a lighting apparatus and a data reading portion, according to a tenth embodiment of the present invention.
Figure 23:
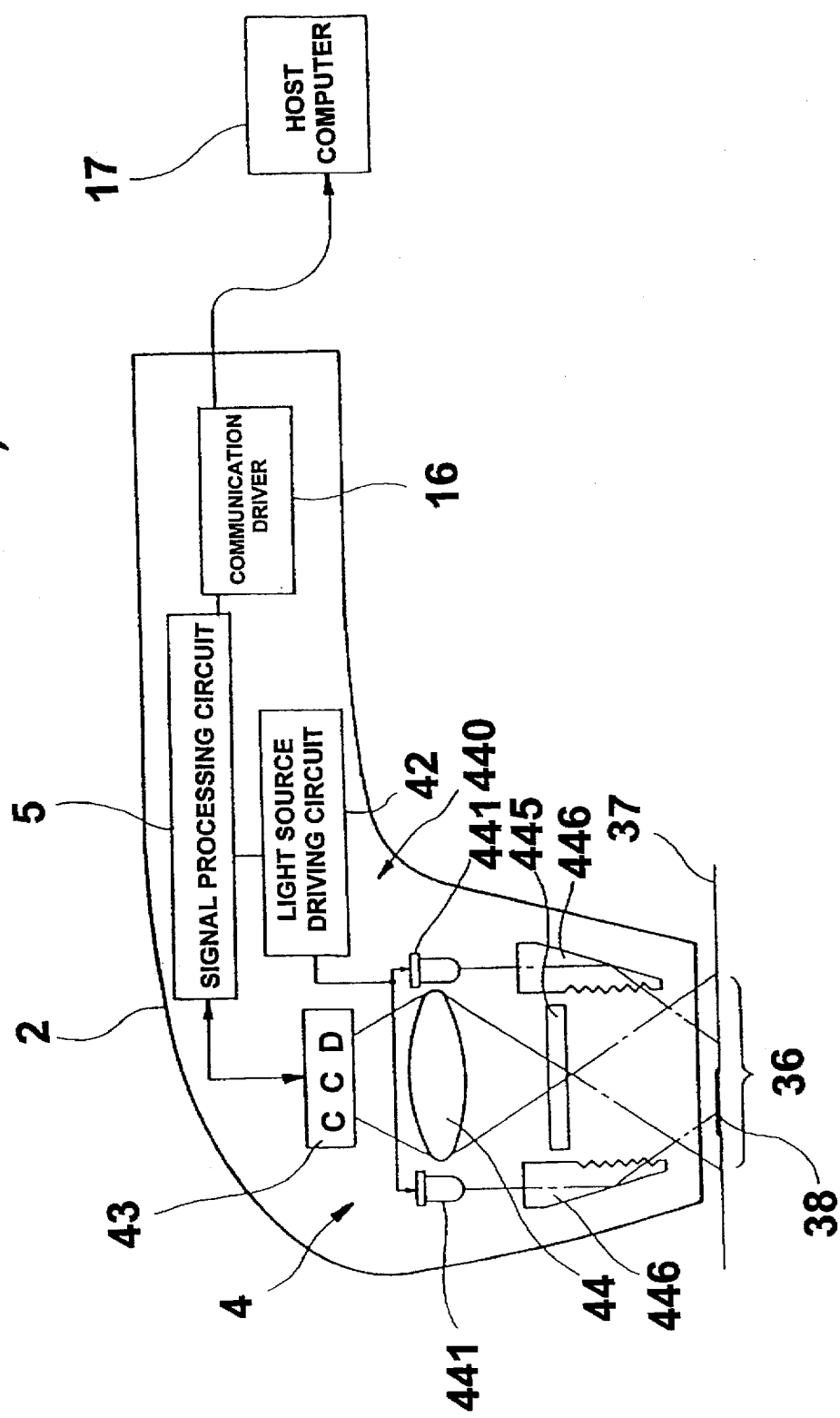
FIG. 23 is a schematic side sectional view of a data symbol reader according to the present invention.

FIG. 22 shows a partial sectional view of a tenth embodiment of the present invention. The lighting apparatus 340 shown in FIG. 22 is comprised of light sources 341, mirrors 371, end prisms 349. The light sources 341 are provided on an imaginary plane parallel with the reference surface 37, above the CCD 43 to emit the illumination beams in a direction parallel with the reference surface 37. The mirrors 371 are located on the optical axes of the illumination beams emitted from the respective light sources 341 to reflect the illumination beams onto the incident surfaces $349a_1$ and $349a_2$ of the prisms 349. Namely, in the illustrated embodiment, the light guiding optical system is comprised of the mirrors 371 and the prisms 349. With this arrangement, the lighting apparatus can be miniaturized.

The guiding optical system is not limited to those in the illustrated embodiments, and can be comprised of, for example, prisms having no reflecting surface, mirrors and prisms in combination, or optical fibers, etc.

The data reading portion 36 can be of a type in which the beams transmitted through the reference surface are received and utilized, instead of the beams reflected from the reference surface.

The number of the light sources and the positions of the center points of illumination are appropriately varied depending on the size of the data reading area, the orientation property or luminance of the light sources, etc.

The present invention is not limited to the illustrated embodiments and can be equally applied, for example, to a different size of data reading area. Note that the rectangular data reading area referred to in this specification includes a square data reading area.

As can be understood from the above discussion, according to the present invention, since the light sources can be positioned close to the data reading portion, a small lighting apparatus can be provided. Moreover, according to the present invention, the data symbol reading area can be uniformly illuminated.

In particular, if there is a shading means provided in the lighting apparatus, the data reading area can be uniformly illuminated with the illumination beams incident thereupon at a large incident angle, while preventing the beams emitted by the light sources from being directly incident upon the data reading area. Furthermore, if there is a diffusion means in the optical paths of the beams emitted from the light sources, the uniformity illumination can be further enhanced.

(Intentionally Left Blank Below This Line)

The lighting apparatus 440 will be discussed below.

Figure 25:
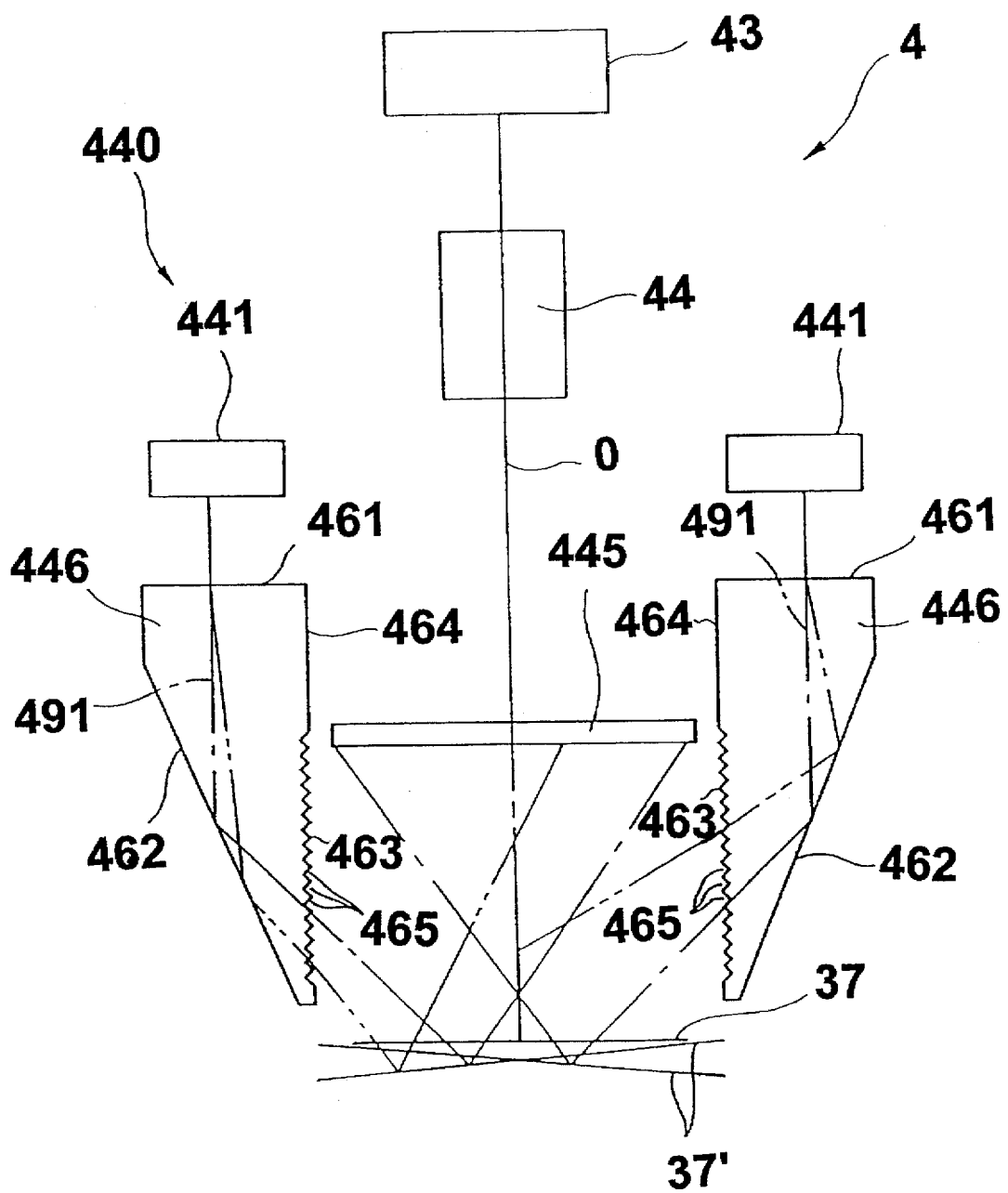
FIG. 25 is a schematic side elevational view of a lighting apparatus and a data reading portion, according to the present invention.
Figure 26:
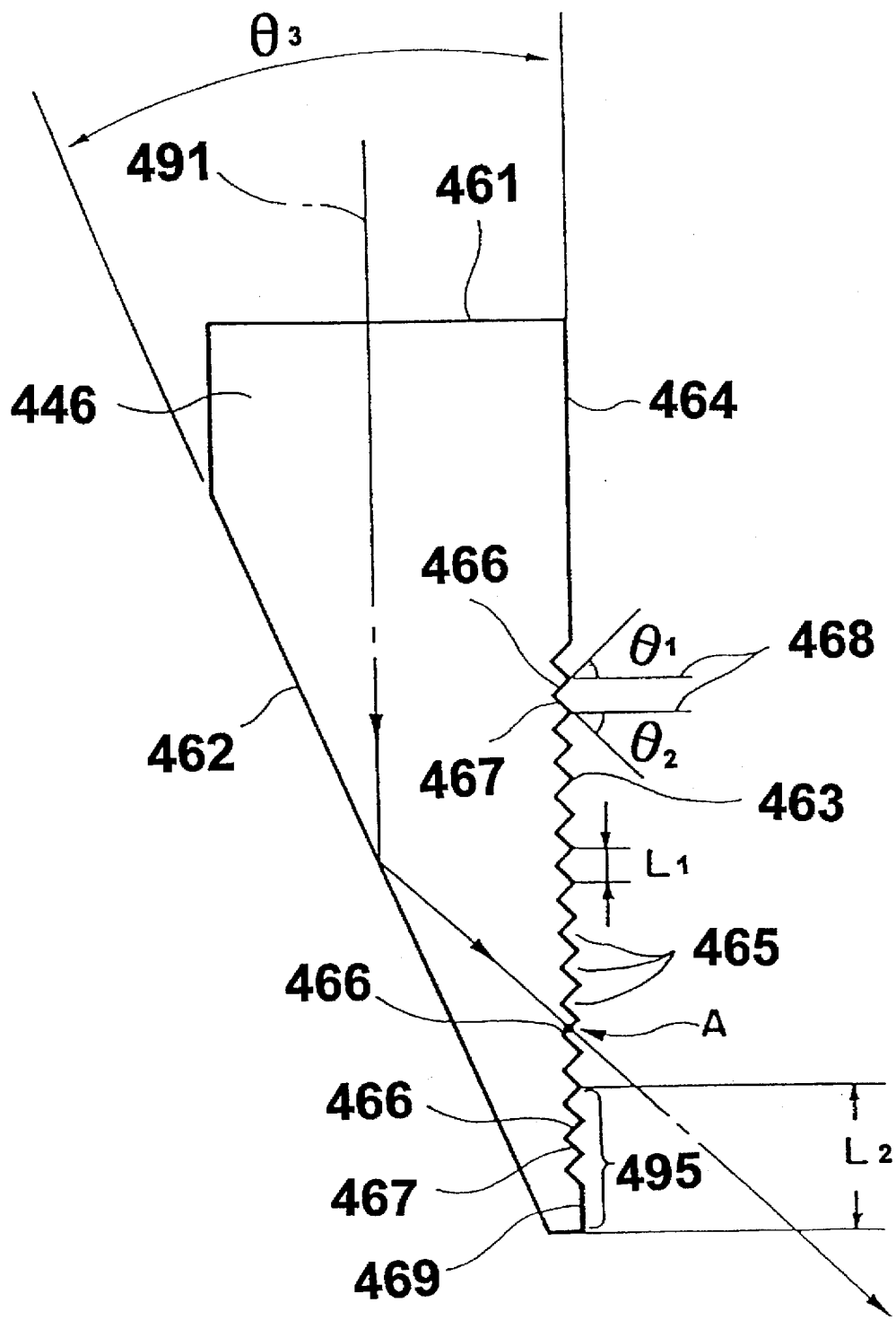
FIG. 26 is a side elevational view of a prism according to the present invention, by way of example.
Figure 27:
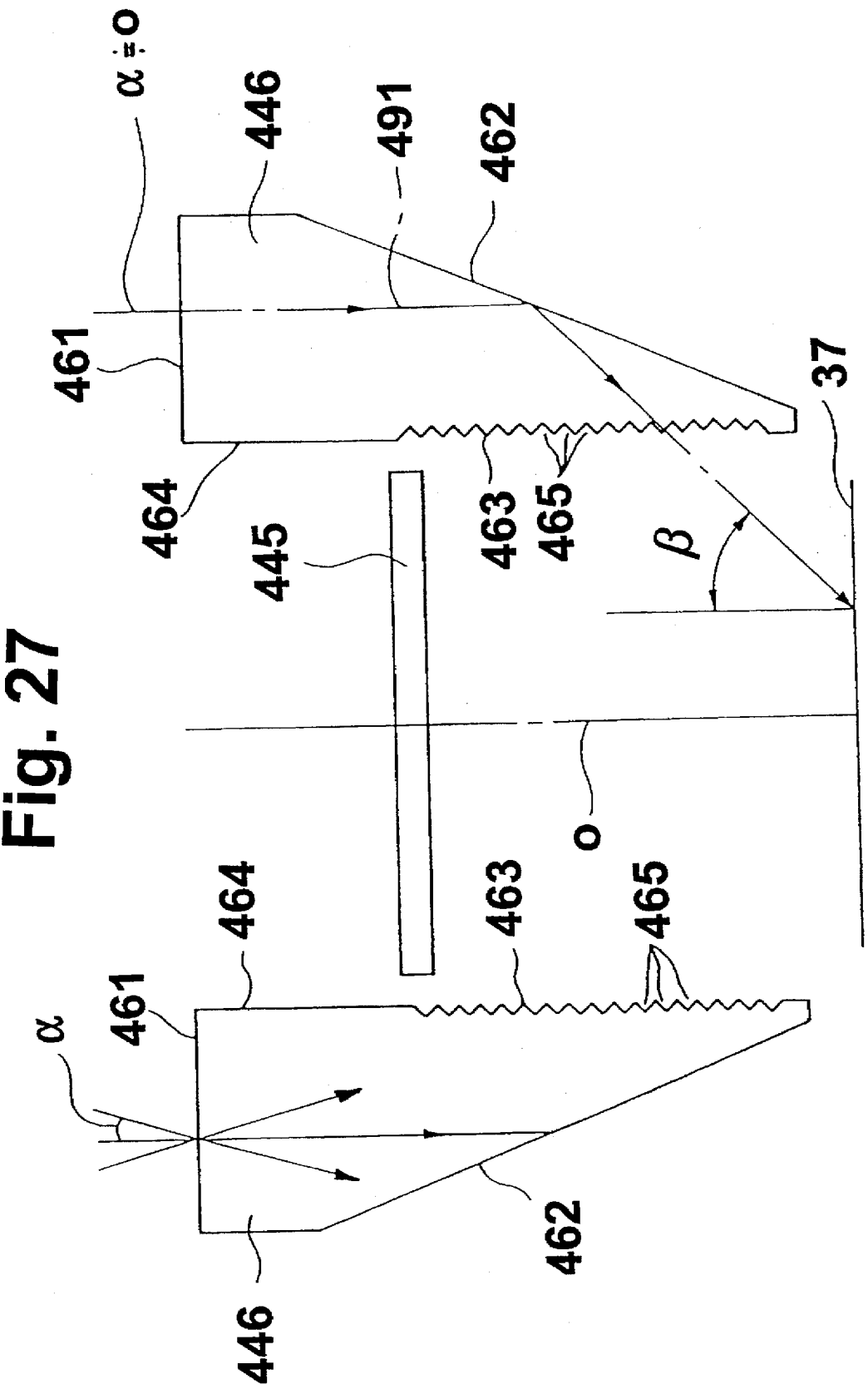
FIG. 27 is a side elevational view of opposed prisms according to the present invention, by way of example.

FIG. 25 shows an example of the internal structure of the lighting apparatus 440 and the data reading area 36. FIGS. 26 and 27 show an example of prism(s) 446 of the lighting apparatus 440. As shown in FIG. 25, the lighting apparatus 440 includes a plurality of light sources 441 end a pair of prisms 446 located below the light sources 441.

Figure 24:
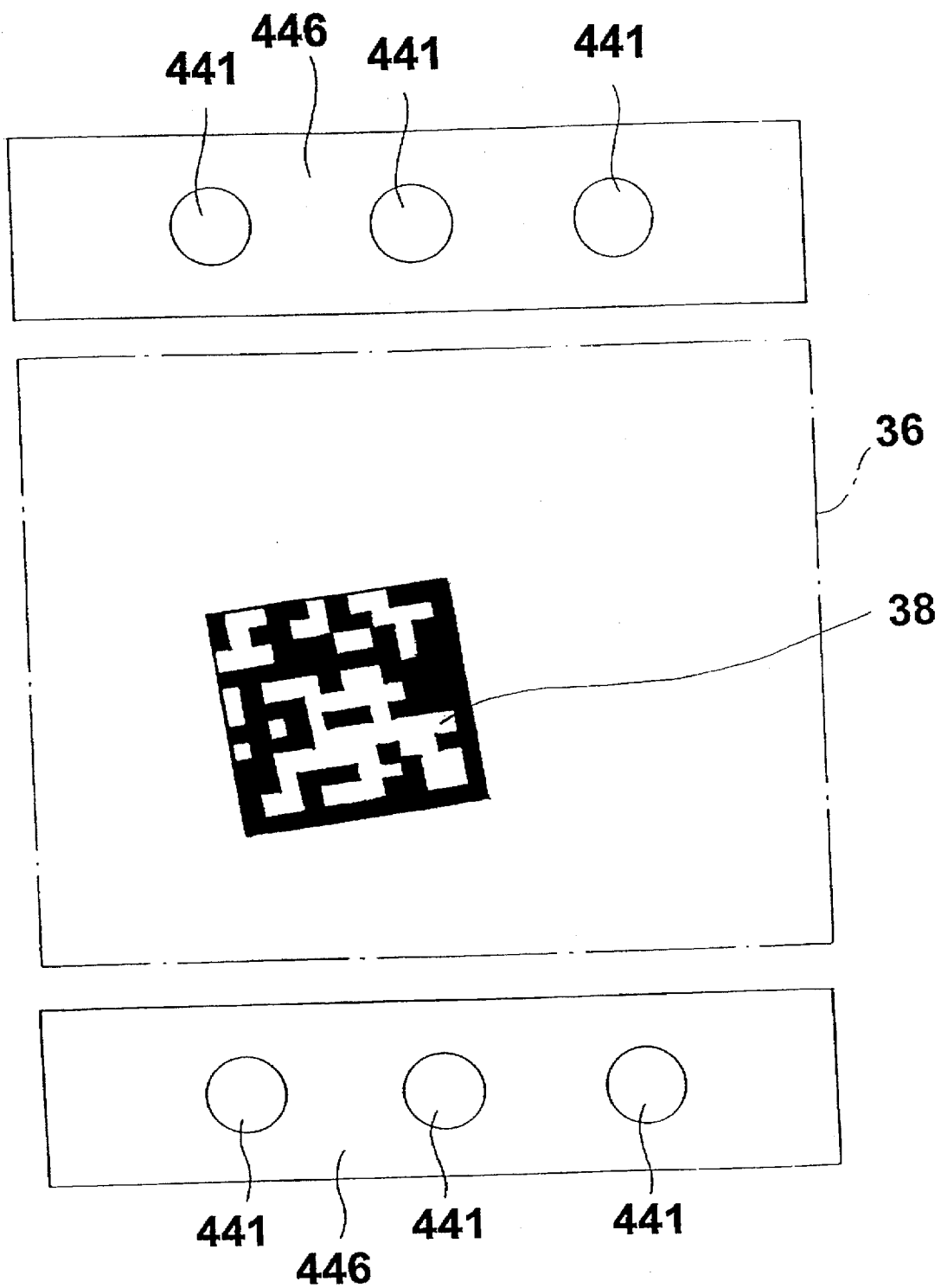
FIG. 24 is a plan view of a symbol reading area, by way of example.

As can be seen in FIG. 24, there are three pairs of light sources 441 provided along a pair of opposed parallel sides (e.g., major sides) that define the data (symbol) reading area 36. For clarity, although the following discussion will be addressed to a pair of light sources 441 that are opposed with respect to the CCD 43, the discussion can be applied to the remaining pairs of light sources 441.

Looking at FIG. 25, the CCD 43 is provided with the light receiving surface perpendicular to the normal line O to the reference surface 37 of the data reading area 36 when the lighting apparatus 440 end the data reading area 36 are parallel with the reference surface 37. The parallel arrangement will be referred to as an appropriate state. In the appropriate state, the optical axes of the beams incident upon the CCD 43 are parallel with the normal line O. The light sources 441 are arranged such that the optical axes of the principal rays which have been emitted from the light sources but have not yet reached the prisms 446 are substantially parallel with the normal line O, i.e., the optical axis of the light to be received by the CCD 43 ($\alpha \approx 0$).

The "principal ray" refers to a ray having the maximum intensity.

As shown in FIG. 25, a pair of prisms 446, 446 are provided on the optical axes of the light smarted from the respective light sources 441 and along the major sides of the rectangular data reading area 36, so that the emitting surfaces 463 of the prisms 446 are opposed to each other.

The prisms 446 are each provided with the incident surface 461, the reflecting surface 462, and the emitting surface 463. The emitting surfaces 463 are provided, on the end portions (upper portions in FIG. 25) thereof adjacent to the light sources 441, with shading surface portions (light absorbing surfaces) 464.

The incident surfaces 461 are diffusion surfaces which can be formed by rough or irregular surfaces with fine projections and depressions. The edge of the V-grooves are parallel with each other and to the plane of the light reading area.

The prism 446 can be made of plastics, such as acrylic resin or polycarbonate, or various kinds of glasses. The refractive index of the prisms is approximately 1.4 to 1.6, and preferably close to 1.5.

The prisms 446 are provided on the emitting surfaces 463 thereof with a plurality of continuous grooves 465 which are generally V-shaped in a cross section and which extend in parallel with the light receiving surface of the data reading area 36, and accordingly, the light receiving surface of the CCD 43. The V-shaped grooves 465 are juxtaposed in a direction perpendicular to the light receiving surface of the CCD 43.

Consequently, there is substantially no surface portion perpendicular to the reference surface 37 in the emitting surfaces 463, except for the end portions 469. Since the groove surfaces 466 and 467 of the V-shaped grooves 465 provided on the emitting surfaces 463 are all inclined with respect to the reference surface 37, all the beams emitted from the emitting surfaces 463 onto the reference surface 37 pass through the groove surfaces 466. If the V-shaped grooves 465 are discontinuously provided on the emitting surfaces 463, the quantity of light passing through the groove surfaces 466 of the discontinuous grooves 465 is smaller than the quantity of light passing through the groove surfaces 466 of the continuous grooves 465. Therefore, it is preferable that the V-shaped grooves 465 are continuously provided on the emitting surfaces 463.

The opposed groove surfaces 466 and 467 of the V-shaped grooves 465 are inclined in opposite directions with respect to the normal line 468 to the emitting surfaces 463. The inclination angles $\theta_1$ and $\theta_2$ of the groove surfaces 466 and 467 adjacent to the reference surface 37 and the CCD 43 (light sources 441), respectively, with respect to the normal lines 468 to the emitting surfaces 463 are appropriately determined in accordance with the inclination angle $\theta_2$ of the reflecting surfaces 462 of the prisms 446, etc.

If the inclination angle $\theta_2$ of the reflecting surfaces 462 of the prisms 46 is 15° to 30°, the inclination angles $\theta_1$ and $\theta_2$ are 30° to 60°.

The width (pitch) $L_1$ of the grooves 465 is not limited to a specific value, and can be optionally selected in accordance with the size of the prisms 446, etc. In an example, $L_1$ is approximately 1 to 2 mm.

For the grooves 465 that are located within a predetermined distance from the ends (lower ends in FIG. 26) of the prisms 446 adjacent to the reference surface 37, i.e., the grooves 465 contained in a predetermined zone 495 in the vicinity of the data reading area 36, the groove surfaces 466 and 467 thereof are diffusion surfaces. The end surfaces 469 within the zone 495 are also diffusion surfaces. The diffusion surfaces are formed, for example, by rough (frosted) or irregular surfaces with fine projections and depressions.

The zone 495 is closer to the data reading area 36 than the point "A" (intersection point of the optical axis 491 of the principal ray emitted from the emitting surface 463 and the groove surface 466) on the emitting surface 463. The width $L_2$ of the zone 495 is not limited to a specific value and can be optionally selected in accordance with the size of the prisms 446 or the inclination angle $\theta_3$, etc. For example, $L_2$ is approximately 2 to 4 mm.

As shown In FIG. 25 there is a protection glass plate 445 between the opposed prisms 446 in the vicinity of the connecting portions of the emitting surfaces 463 and the shading surfaces 464 to prevent a foreign matter, such as dust from entering the inside of the apparatus.

The operation of the prisms 446 will be described below.

As can be seen in FIG. 25, the beams emitted from the light sources 41 are made incident upon the prisms 446 through the incident surfaces 461 thereof. Since the incident surfaces 461 are diffusion surfaces, as mentioned above, the incident beams are diffused by the diffusion surfaces 461 to enter the prisms 446.

The diffusion surfaces 461 contribute to a diffusion of the incident beams and an enhancement of the uniformity of the luminance within the illumination desired range value. Note that in FIG. 25, the optical axes 491 of the principal rays are indicated by dotted and dashed lines, and specific rays of the diffused light are indicated by two-dotted and dashed lines, respectively.

The beams incident upon the prisms 46 are reflected by the reflecting surfaces 462 and emitted from the emitting surfaces 463. The shading surfaces 464 prevent the direct beams emitted from the light sources 441 or the beams diffused by the diffusion surfaces 461 from being incident upon the data reading area 36.

Since the emitting surfaces 463 are provided with the V-shaped grooves 465, as mentioned above, the beams reflected by the reflecting surfaces 462 are made incident upon the groove surfaces 466 of the V-shaped grooves 465 at right angles or angles approximate thereto, as shown in FIG. 26. Consequently, the beams reflected by the reflecting surfaces 462 are made incident upon the reference surface 37 at a smaller incident angle, in comparison with the absence of the grooves 465, since no or little refraction of the reflected beams occur when the beams pass through the groove surfaces 466.

In the illustrated embodiment, since the grooves 465 are formed such that the groove surfaces 466 are perpendicular to the optical axes 491 of the principal rays reflected by the reflecting surfaces 462, as shown in FIG. 25, the beams on the optical axes 491 travel straight through the groove surfaces 466 of the grooves 465 that are located adjacent to the reference surface 37 toward the data reading area 36. Moreover, the beams spaced from the optical axes do not travel straight, but are refracted and emitted from the emitting surfaces 463 at e small angle.

As can be seen in FIG. 26, since the emitting surfaces 463 within the zone 495 are diffusion surfaces, the beams incident upon the groove surfaces 466 within the zone 495 from the reflecting surfaces 462 are diffused by the emitting surfaces 463 and made incident upon the data reading surface 37.

Figure 30:
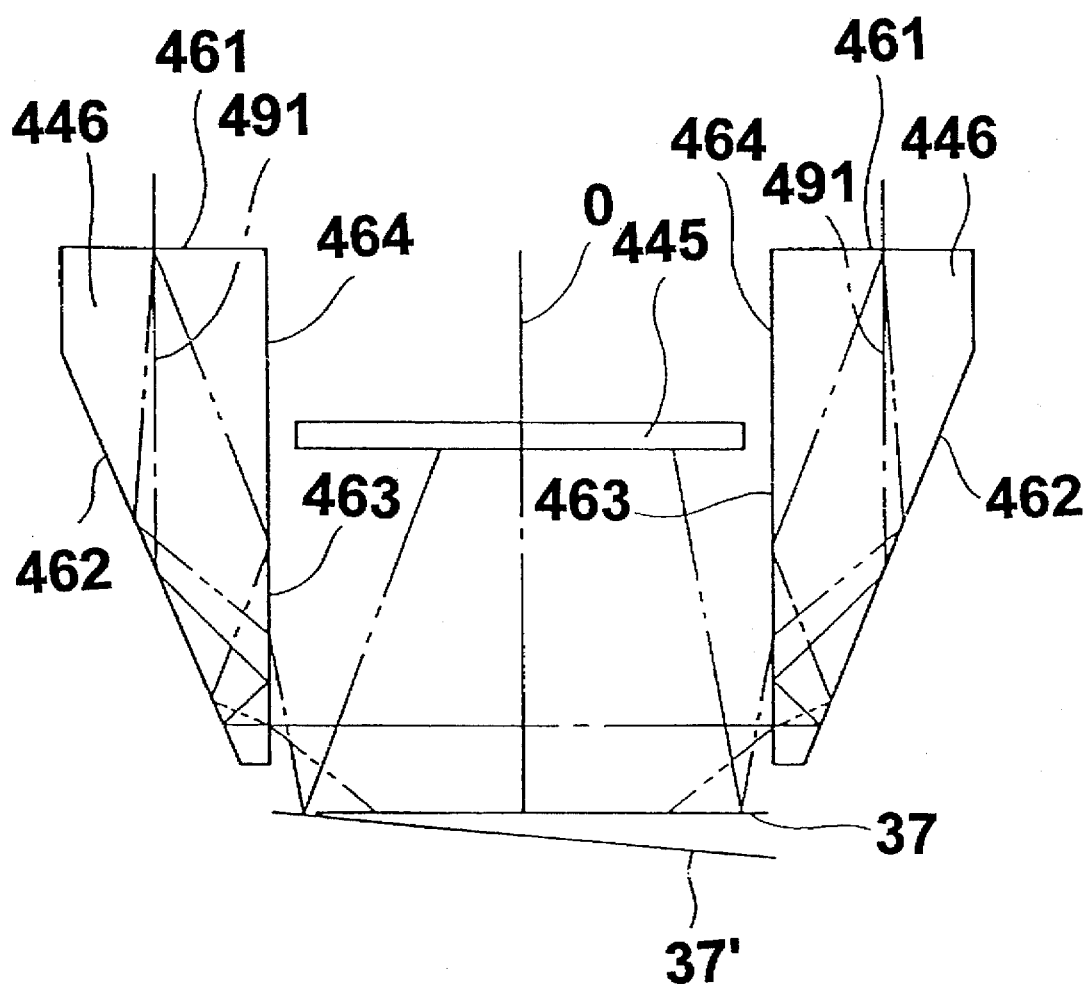

If there is no groove on the emitting surfaces 463 of the prisms 446, as shown in FIG. 30, the beams reflected by the reflecting surfaces 462 are made incident upon the emitting surfaces 463 at acute incident angles. Accordingly, the beams are considerably refracted by the emitting surfaces 463 and made incident upon the data reading area. In comparison with the absence of the groove 465, according to the present invention, the incident angle of the beams upon the data reading area 36 (i.e., the angle of the beams with respect to the normal line to the reference surface 37 of the data reading area 36) can be increased and the beams can be made incident upon the end portions of the symbol reading area 36 adjacent to the prisms 446.

Consequently, if the reference surface 37 is inclined, for example at an inclination angle of +5° or −5°, from the appropriate state, as indicated at 37' in FIG. 30, the beams emitted from the emitting surface 463 are reflected within the data reading area 36 and reach the CCD 43, so that spurious images of the light sources can be formed in the CCD 43, resulting in an incorrect detection of the data symbols.

According to the present invention, as shown in FIG. 26, since the grooves 465 are provided on the emitting surfaces 463 of the prisms 446, the incident angle β of the principal rays incident upon the symbol data reading area 36 (i.e., angle of the optical axes 491) of the principal rays with respect to the normal line O to the reference surface 37 of the data reading area 36 when the normal line O to the reference surface 37 is parallel with the optical axes of the beams to be received by the data reading area 36, can be increased in comparison with the case where there is no groove 465 on the emitting surfaces 463 of the prisms 446.

Consequently, as shown in FIG. 25, if the reference surface 37 is parallel with the data reading portion 404 or even if the reference surface 37 is inclined with respect to the appropriate state thereof (for example at an inclination angle of +5° or −5°), no spurious image of the light sources can be formed in the CCD 43. Thus, according to the present invention, the data symbols can be correctly read, regardless of the state (inclination) of the reference surface 37 of the data reading area 36.

The increase in the incident angle β contributes to a uniform illumination of the data reading area 36. For example, the incident angle β is 30° to 60°, preferably, 40° to 50°.

In the data symbol reader 1 according to the present invention, since the emitting surfaces of the prisms 446 within the predetermined ranges 495 are diffusion surfaces, as mentioned above, the illumination beams which would be otherwise concentrated on the end portions of the data reading area can be effectively diffused. Consequently, if the object to be read has a high reflectivity, the surface of the object (reference surface 37 of the data reading area 36) can be uniformly illuminated.

In the illustrated embodiment, since the prisms 446 are used as the optical guide system which deflects the beams emitted from the light sources 441 in predetermined directions so as to make the same incident upon the reference surface 37 of the data reading area 36, the number of the components can be reduced in comparison with an optical guide system in which optical elements such as mirrors are employed in combination.

Preferably, the position of the incidence of the principal rays 491 upon the reference surface 37 of the data reading area 36 is located at a distance of 0.1 to 0.34 times the length of the sides (minor sides) of the data reading area perpendicular to the major sides thereof, from the major sides. If the distance is within 0.1 to 0.34 times the length of the minor sides of the data reading area, a more uniform luminance of the whole data reading area can be obtained.

The light sources 441 are arranged such that if the normal line O of the reference surface 37 is parallel with the optical axes of the beams received by the data reading portion 4 (i.e., the beams incident upon the CCD 43), the angle α between the optical axes of the beams received by the data reading portion, i.e., the normal line O of the reference surface 37 and the optical axes 491 of the principal rays emitted from the light sources 441 but not reaching the prisms 446 is nearly equal to 0 ($\alpha \approx 0$). In other words, the optical axes of the beams received by the data reading portion are substantially parallel with the optical axes 491 of the principal rays.

With this arrangement, the light sources 441 can be provided close to the CCD 43, resulting in a small and compact lighting apparatus 440.

In the present invention, preferably $\alpha < \beta$, as mentioned above. The shape of the prisms 346, and accordingly, the angles and positional relationship of the incident surfaces 461, the reflecting surfaces 462, and the emitting surfaces 463 (groove surfaces) of the prisms 446, and the positional relationship between the prisms 446 and the light sources 441 are appropriately determined to satisfy $\alpha < \beta$. If $\alpha < \beta$, the lighting apparatus 440 and the data symbol reader can be miniaturized. Note that α is not necessarily equal to or nearly equal to zero.

The present invention is not limited to the illustrated embodiments, For instance, although the groove surfaces 466 and 467 of the grooves 465 within the ranges 495 of the emitting surfaces 463 of the prisms 46 are diffusion surfaces, it is possible to provide the diffusion surfaces only on the groove surfaces 466 adjacent to the reference surface 37.

Moreover, it is possible to provide no diffusion surfaces on the emitting surfaces 463 (groove surfaces 466 and 467).

Although the incident surfaces 461 of the prisms 46 are diffusion surfaces in the illustrated embodiments, it is possible to provide the incident surfaces 461 that are not diffusion surfaces. In this alternative, diffusion plates are adhered to or disposed in front of the incident surfaces 461 of the prisms 446 at a predetermined distance.

The reflecting surfaces 462 and the shading surfaces 463 of the prisms 446 can be replaced with reflecting plates and shading plates, respectively.

The shading surfaces 463 of the prisms 446 are not limited to light absorbing surfaces as in the above-mentioned embodiments, and can be for example reflecting surfaces (mirror surfaces), half mirrors, or optical filters, etc. The transmitance of these optical elements can be optionally selected.

The grooves 465 of the prisms 46 are identical in shape, width, pitch and inclination angles ($\theta_1$, $\theta_2$), etc., in the illustrated embodiments. However, the grooves 465 can be different in the direction of the line normal to the light receiving surface of the CCD 43 (i.e., in the direction of the optical axes of the principal rays before reaching the prisms 446).

The data reading portion 4 can be of a type in which the beams transmitted through the reference surface 37 are received and utilized, instead of the beams reflected from the reference surface.

The number of the light sources and the positions of the center points of illumination are appropriately varied depending on the size of the data reading area, the orientation property or luminance of the light sources, etc.

The present invention is not limited to the illustrated embodiments and can be equally applied, for example, to a different size of data reading area. Note that the rectangular data reading area referred to in this specification includes a square data reading area.

Several examples of the luminance distribution will be discussed below.

The luminance distributions of the data reading area 36 in the horizontal direction (minor side direction) were measured using the lighting apparatus 440 shown In FIG. 25. The six light emitting diodes used as the light sources were identical to each other. The orientation property thereof is shown in FIG. 6. The size of the data reading area 36 was as follows; Lx=18.5 mm and Ly=24.5 mm.

Other experimental conditions in the examples were described below.

Figure 28:
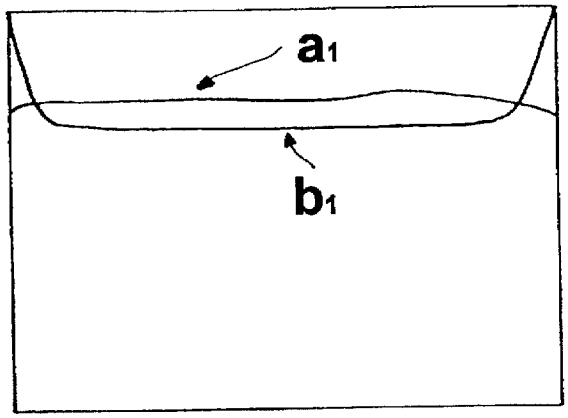
FIG. 28 is a graph of a luminance distribution of a data reading area in a horizontal direction (minor side direction), according to the present invention.
Figure 29:
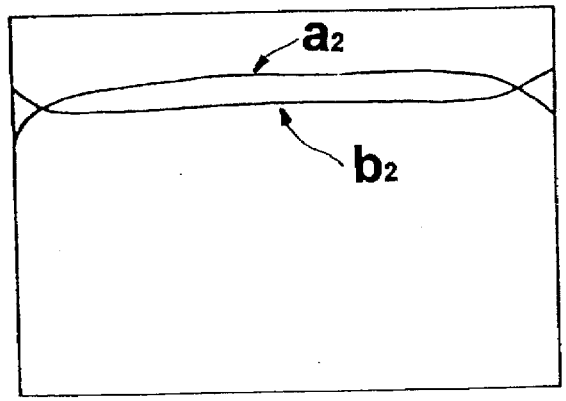
FIG. 29 is a graph of a illumination distribution of a data reading area in a horizontal direction (minor side direction), according to the present invention; and, FIG. 30 is a side elevational view of opposed prisms having no grooves on the emitting surfaces thereof.

FIGS. 28 and 29 show examples of luminance distribution of the data reading area 36 (FIG. 25) in the horizontal direction (minor side direction), using the prisms whose conditions were described below. In FIGS. 28 and 29, the ordinate represents the level of the video signals (unit: IRE), and the abscissa represents the position of the illumination points in the horizontal direction. The curves "$a_1$" and "$a_2$" designate the luminance distributions when a subject to be read is a highly diffusing paper, and the curves "$b_1$" and "$b_2$" designate the luminance distributions when a subject to be read is a highly reflective paper. It should be appreciated that the degree of the uniformity increases as the curves was "$a_1$", "$a_2$", "$b_1$", and "$b_2$" are as approximate to straight as possible.

EXAMPLE 11:

The prisms used were as follows. The emitting surfaces of the prisms were not the diffusion surfaces.

Material of the prisms: Acrylic resin (refractive index= 1.5)

Width $L_1$ of the grooves: 1 mm

Angle $\theta_1$: 45°

Angle $\theta_2$: 35°

Angle $\theta_3$: 22.5°

Angle $\alpha$: 0°

Angle $\beta$: 45°

The results are shown in FIG. 28.

EXAMPLE 12:

In the prisms used, the groove surfaces 466 and 467 and the end surfaces 469 within the range 495 of the emitting surfaces of were diffusion surfaces. Other requirements of the prisms were identical to those in example 11 mentioned above.

Width $L_2$ of the range 495: 4 mm

The results are shown in FIG. 29.

As can be seen from the experimental results shown in FIG. 28, in example 11 in which the emitting surfaces of the prisms were not the diffusion surfaces, the highly diffusing paper could be uniformly illuminated over the whole data reading area 39. Even in the case of the highly reflective paper, a uniform illumination thereof could be achieved except for the end portions of the data reading area 39.

Also, as may be seen from the experimental results shown in FIG. 29, in example 12 in which the emitting surfaces of the prisms within the range 495 thereof were the diffusion surfaces, not only the highly diffusing paper but also the highly reflective paper could be uniformly illuminated over the whole data reading area 39.

As can be understood from the foregoing, according to the present invention, since the light sources can be located close to the data reading area, a small lighting apparatus which uniformly illuminates the symbol reading area can be obtained.

Regardless of the state of the reference surface of the data reading area, that is, if the reference surface is parallel with or inclined with respect to the data reading portion, no direct entrance of the reflected light into the data reading portion takes place, so that data can be correctly read without the need for a precise adjustment or positioning of the illumination light in the horizontal direction with respect to the reference surface.

Furthermore, if the portions of the emitting surfaces of the prisms in the vicinity of the data reading area are diffusion surfaces, the data symbol reading area can be uniformly illuminated, regardless of the characteristics (reflection or diffusion characteristics) of the object to be read. Consequently, the symbol reading areas of various characteristics of objects can be correctly read or detected.

We claim:

1. A lighting apparatus which illuminates a two dimensional data reading area for a data reader, comprising:
   a plurality of light sources arranged to define rows extending along each of one pair of opposing sides of said two dimensional data reading area;
   an optical axis for each said light source being inclined at a predetermined inclination angle with respect to a line normal to a reference surface of said two dimensional data reading area.

2. The lighting apparatus according to claim 1, said light sources defining each of said rows having substantially parallel optical axes.

3. The lighting apparatus according to claim 1, said predetermined inclination angle being equal for each of said plurality of light sources defining each of said rows.

4. The lighting apparatus according to claim 1, said light sources emitting beams of light, said light sources positioned such that optical axes of said light beams emitted from said light sources form a two dimensional array in a plane parallel to said reference surface.

5. A lighting apparatus which illuminates a two dimensional data reading area for a data reader, comprising:
   a plurality of light sources arranged to define rows extending along each of a first pair of opposing sides of said two dimensional data reading area;
   an optical axis of said light rays emitted from each said light source being inclined at a predetermined inclination angle with respect to a line normal to a reference surface which includes said two dimensional data reading area;
   said optical axes of light rays emitted from said light sources onto said reference surface being spaced from each of said first pair of opposing sides of said two dimensional data reading area by a distance within a range of 0.1 to 0.34 times a length of an other pair of opposing sides of said two dimensional data reading area.

6. A lighting apparatus according to claim 5, wherein said predetermined inclination angle of said optical axes with respect to said line normal to said reference surface is inclined 30° to 60°.

7. A lighting apparatus according to claim 5 wherein said first pair of opposing sides of said two dimensional data reading area are major sides.

8. A lighting apparatus according to claim 5, wherein said light sources arranged along said first pair of opposing sides are symmetrical with respect to a center of said data reading area.

9. A lighting apparatus according to claim 5, wherein said two dimensional data reading area is in a form of a rectangle.

10. A lighting apparatus according to claim 5, wherein said two dimensional data reading area is in the form of a pattern of black and white segments in a matrix arrangement.

11. The lighting apparatus according to claim 5, said light sources defining each of said rows having substantially parallel optical axes.

12. The lighting apparatus according to claim 5, said predetermined inclination angle being equal for each of said plurality of light sources defining each of said rows.

13. The lighting apparatus according to claim 5, said light sources emitting beams of light, said light sources positioned such that optical axes of said light beams emitted from said light sources form a two dimensional array in a plane parallel to said reference surface.

14. A lighting apparatus which illuminates a rectangular data reading area for a data reader, comprising:

a plurality of light sources arranged to define rows extending along each of a pair of opposing sides of said rectangular data reading area and which emit light beams to illuminate said rectangular data reading area; and, an adjuster for each said light source which adjusts a illuminance of each of said light sources at a center point of illumination of said light source incident on a reference surface which includes said rectangular data reading area to uniformly illuminate said rectangular data reading area.

15. A lighting apparatus according to claim 14, wherein said adjusters adjust a distance between said light sources and said center points of illumination on said reference surface.

16. A lighting apparatus according to claim 14, wherein said adjuster for each said light source is in the form of an optical diffuser.

17. A lighting apparatus according to claim 14, wherein said adjuster for each said light source is a beam attenuator.

18. A lighting apparatus according to claim 14, wherein said optical axis of each said light source is inclined at a predetermined inclination angle with respect to said reference surface of said rectangular data reading area, and wherein said optical axis of each said light source which is incident on said reference surface is spaced from said one pair of opposing sides of said rectangular data reading area by a distance within a range of 0.1 to 0.34 times a length of an other pair of opposing sides of said rectangular data reading area.

19. A lighting apparatus according to claim 14, wherein said luminance of said light sources at said center points of illumination are adjusted such that the outermost of said light sources with respect to a center of said rectangular area have a higher luminance with respect to the other said light sources.

20. The lighting apparatus according to claim 14, said light sources defining each of said rows having substantially parallel optical axes.

21. The lighting apparatus according to claim 18, said predetermined inclination angle being equal for each of said plurality of light sources defining each of said rows.

22. The lighting apparatus according to claim 14, said light sources emitting beams of light, said light sources positioned such that optical axes of said light beams emitted from said light sources form a two dimensional array in a plane parallel to said reference surface.

* * * * *